United States Patent
Cooke et al.

(10) Patent No.: US 12,298,585 B2
(45) Date of Patent: May 13, 2025

(54) PRECONNECTORIZED DISTRIBUTION CABLE ASSEMBLIES AND METHODS OF MAKING USING A PULL STRING

(71) Applicant: CORNING RESEARCH & DEVELOPMENT CORPORATION, Corning, NY (US)

(72) Inventors: Terry Lee Cooke, Hickory, NC (US); Michael Todd Faulkner, Granite Falls, NC (US); Christopher Shawn Houser, Hickory, NC (US); Lars Kristian Nielsen, Denver, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 236 days.

(21) Appl. No.: 17/872,137

(22) Filed: Jul. 25, 2022

(65) Prior Publication Data

US 2022/0357542 A1    Nov. 10, 2022

Related U.S. Application Data

(63) Continuation of application No. PCT/US2021/014269, filed on Jan. 21, 2021.

(Continued)

(51) Int. Cl.
*G02B 6/44* (2006.01)
*G02B 6/38* (2006.01)

(52) U.S. Cl.
CPC ......... *G02B 6/4475* (2013.01); *G02B 6/3897* (2013.01); *G02B 6/441* (2013.01); *G02B 6/443* (2013.01); *G02B 6/4431* (2023.05)

(58) Field of Classification Search
CPC . G02B 6/44715; G02B 6/4472; G02B 6/4431
See application file for complete search history.

(56) References Cited

U.S. PATENT DOCUMENTS

| 7,251,411 B1 | 7/2007 | Lu et al. |
| 2006/0233506 A1* | 10/2006 | Noonan ............... G02B 6/3885 |
| | | 385/100 |

(Continued)

FOREIGN PATENT DOCUMENTS

| EP | 2157461 A1 | 2/2010 |
| EP | 2216666 A1 | 8/2010 |

OTHER PUBLICATIONS

European Patent Application No. 21747444.4 Extended European Search Report dated May 14, 2024; 10 Pages; European Patent Office.

(Continued)

*Primary Examiner* — Eric Wong
(74) *Attorney, Agent, or Firm* — William D. Doyle

(57) ABSTRACT

Disclosed herein are preconnectorized cable assemblies and methods of making using a pull string. One embodiment of the disclosure relates to a method of manufacturing a distribution cable assembly using a pull string fed through a jacket of a distribution cable. Subunit cables are attached to the pull string through openings in the jacket of the distribution cable, and then pulled, via the pull string, through the jacket until drawn through a distribution end opening of the jacket. Another embodiment relates to a distribution cable assembly including junction shells covering side openings in the jacket. The junction shell includes a first half shell attached to a second half shell by a fastener. The first half shell includes stops proximate ends of a side opening to fix the junction shell along an axis of the jacket.

8 Claims, 19 Drawing Sheets

Related U.S. Application Data

(60) Provisional application No. 62/967,066, filed on Jan. 29, 2020.

(56) References Cited

U.S. PATENT DOCUMENTS

| | | | |
|---|---|---|---|
| 2007/0098342 A1 | 5/2007 | Temple et al. | |
| 2007/0212004 A1* | 9/2007 | Lu | G02B 6/4475 |
| | | | 385/100 |
| 2008/0253729 A1* | 10/2008 | Gronvall | G02B 6/4472 |
| | | | 385/137 |
| 2010/0158453 A1 | 6/2010 | Cody et al. | |
| 2010/0232752 A1* | 9/2010 | Labraymi | G02B 6/44515 |
| | | | 385/99 |
| 2011/0311226 A1 | 12/2011 | Smith et al. | |
| 2012/0328253 A1 | 12/2012 | Hurley et al. | |
| 2013/0034336 A1 | 2/2013 | Cassell et al. | |
| 2015/0378112 A1* | 12/2015 | Marcouiller | G02B 6/3879 |
| | | | 385/56 |
| 2016/0216472 A1 | 7/2016 | Ott | |
| 2016/0238814 A1 | 8/2016 | Cody et al. | |
| 2018/0172940 A1* | 6/2018 | Kaplan | G02B 6/4454 |
| 2024/0170931 A1* | 5/2024 | Maranto | H02G 1/081 |

OTHER PUBLICATIONS

International Search Report and Written Opinion of the International Searching Authority; PCT/US2021/014269; dated May 24, 2021; 15 pages; US Patent Office.
Invitation to Pay Additional Fees of the International Searching Authority; PCT/US2021/014269; mailed on Mar. 24, 2021, 2 pages; European Patent Office.

* cited by examiner

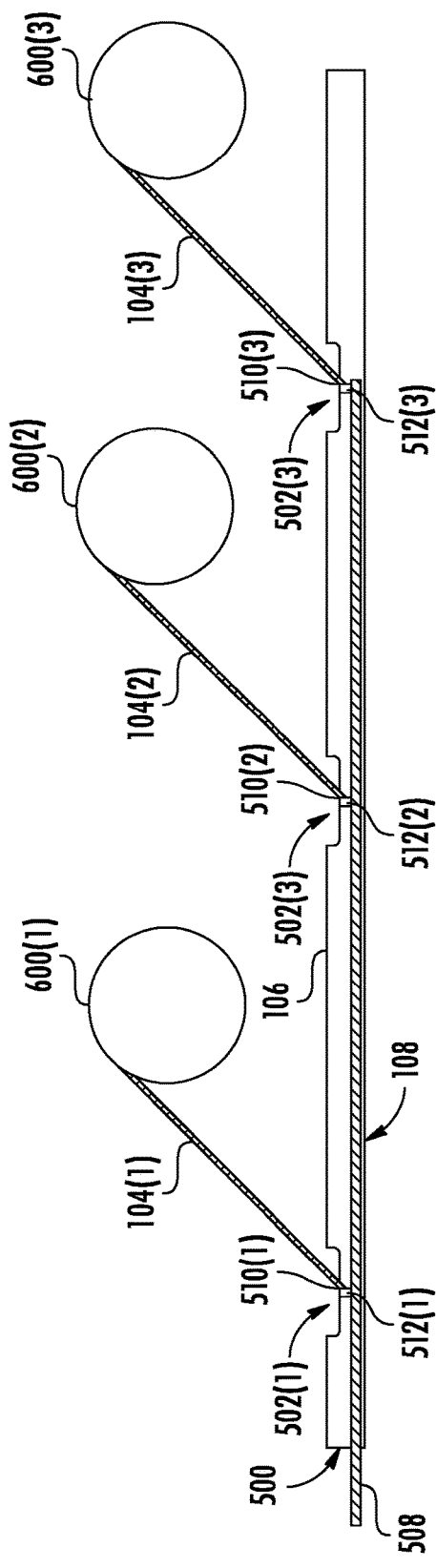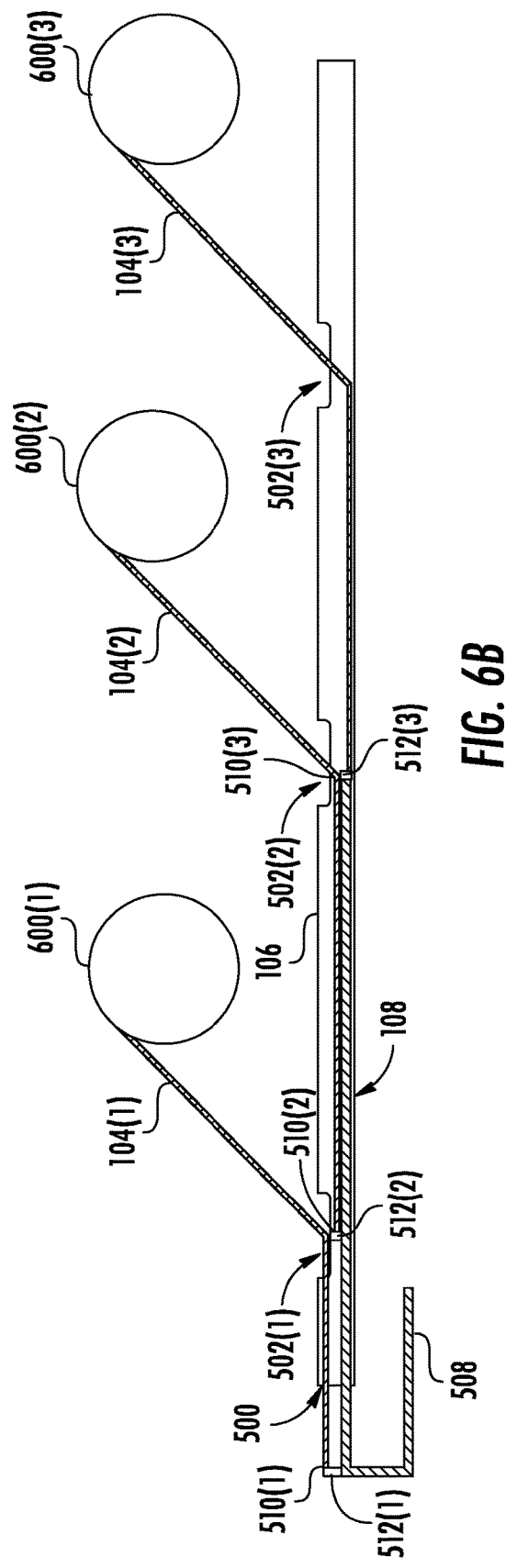

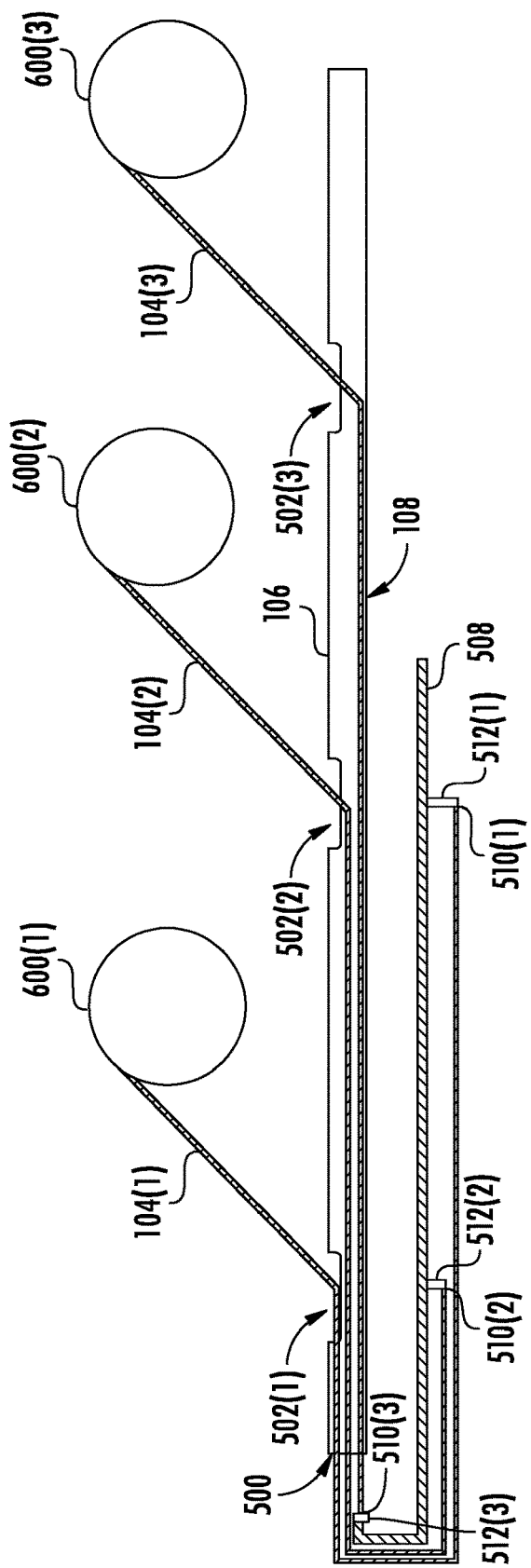
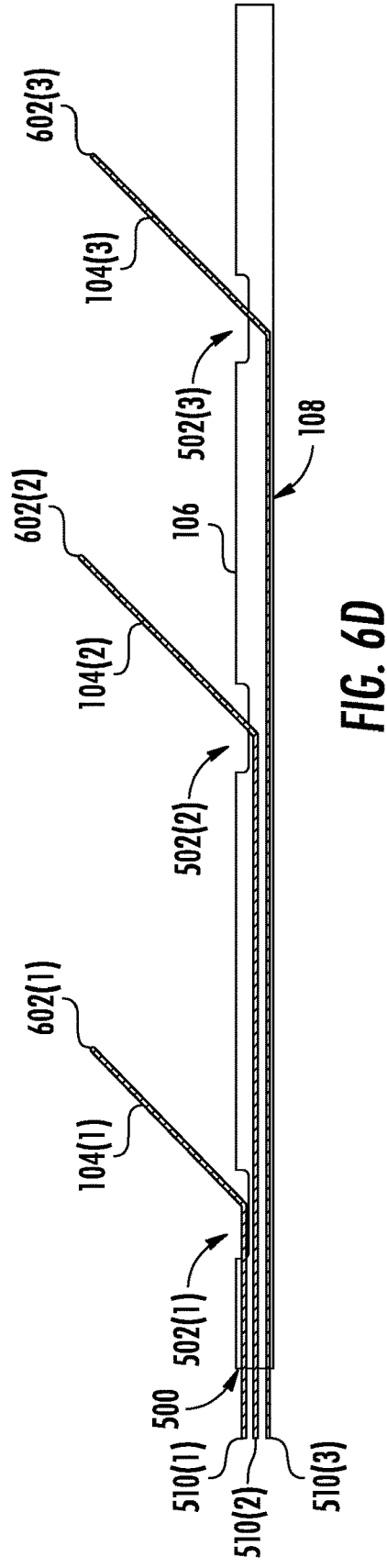
FIG. 6C
FIG. 6D

PRECONNECTORIZED DISTRIBUTION CABLE ASSEMBLIES AND METHODS OF MAKING USING A PULL STRING

PRIORITY APPLICATION

This application Is a continuation of International Patent Application No. PCT/US2021/014269 filed Jan. 21, 2021, which claims the benefit of priority of U.S. Provisional Application No. 62/967,066, filed on Jan. 29, 2020, the content of which is relied upon and incorporated herein by reference in its entirety.

BACKGROUND

The present disclosure relates to preconnectorized optical cable assemblies and methods of making using a pull string.

Data center design and cabling-infrastructure architecture are increasingly large and complex, which requires incorporation of high density optical components (e.g., optical fiber densities), such as to compensate for limited space and meet increasing performance demands. Many data centers include fiber optic cables which have a number of advantages in waveguide systems compared to bulky traditional conductor cables (e.g., copper). Fiber optic cables provide wide bandwidth data transmission, transport multiple signals and traffic types, and/or deliver high-speed Internet access, especially as data rates increase. Data centers utilize multi-fiber cables to interconnect and provide signals between building distribution frames and/or to individual unit centers (e.g., computer servers). However, the labor and cost of deployment of such multi-fiber cable networks for a data center can be high. Thus, there is a desire to reduce the time and costs associated with data center construction, particularly regarding cabling installation.

One way to improve optical infrastructure installation efficiency is to pre-engineer infrastructure components. Such components (e.g., fiber optic cables) may be preterminated in a factory with connectors installed, tested, and packaged for fast, easy, and safe installation at a data center. In this way, the installer merely needs to unpacks the components, pull or route the preconnectorized fiber optic cable assembly, snap in connectors, and/or install patch cords to end equipment, etc. This saves a significant amount of time, effort, and costs compared to on-site connectorization and assembly of cables.

Pre-engineering such components presents challenges to decrease costs, waste, and/or effort in assembling such pre-configured multi-fiber optical cables to enable efficient handling, maintenance, and/or installation.

SUMMARY

One embodiment of the disclosure relates to a method of manufacturing a distribution cable assembly. The method includes feeding a pull string through a jacket of a distribution cable with at least a portion of the pull string extending through a distribution end opening of the jacket. The method further includes attaching a distribution end of a first cable subunit to the pull string through a first side opening in the jacket of the distribution cable. The first cable subunit includes at least one optical fiber. The method further includes attaching a distribution end of a second cable subunit to the pull string through a second side opening in the jacket of the distribution cable, the second cable subunit comprising at least one optical fiber. The method further includes pulling the pull string through the jacket of the distribution cable to pull the distribution ends of the first cable subunit and the second cable subunit through the jacket until the distribution ends of the first cable subunit and the second cable subunit are drawn through the distribution end opening of the jacket to an exterior of the jacket.

An additional embodiment of the disclosure relates to a distribution cable assembly including a distribution cable including a jacket defining a distribution end opening and a first side opening defining a frontward end and a rearward end. The distribution cable assembly further includes a junction shell attached to the jacket and comprising a clamshell covering the first side opening. The junction shell includes a frontward distribution opening, a rearward distribution opening, and a tap opening proximate and parallel to the rearward distribution opening. The junction shell includes a frontward stop and a rearward stop in an interior thereof. The frontward stop is proximate the frontward end of the first side opening and the rearward stop is proximate the rearward end of the first side opening to fix the junction shell along an axis of the jacket.

Additional features and advantages will be set out in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 6A is a cross-sectional view of another step of making the cable assembly of FIGS. 3A-3C illustrating a plurality of subunit cables attached to the pull string through the side openings of the jacket of the distribution cable, in accordance with aspects of the present disclosure.

FIG. 6B is a cross-sectional view of another step of making the cable assembly of FIGS. 3A-3C illustrating partially pulling the distribution ends of the subunit cables through the jacket of the distribution cable via the pull string, in accordance with aspects of the present disclosure.

FIG. 6C is a cross-sectional view of another step of making the cable assembly of FIGS. 3A-3C illustrating pulling the distribution ends of the subunit cables out of the jacket of the distribution cable via the pull string, in accordance with aspects of the present disclosure.

FIG. 6D is a cross-sectional view of another step of making the cable assembly of FIGS. 3A-3C illustrating cutting distribution ends and tap ends of each of the subunit cables, in accordance with aspects of the present disclosure.

DETAILED DESCRIPTION

Figure 1A:
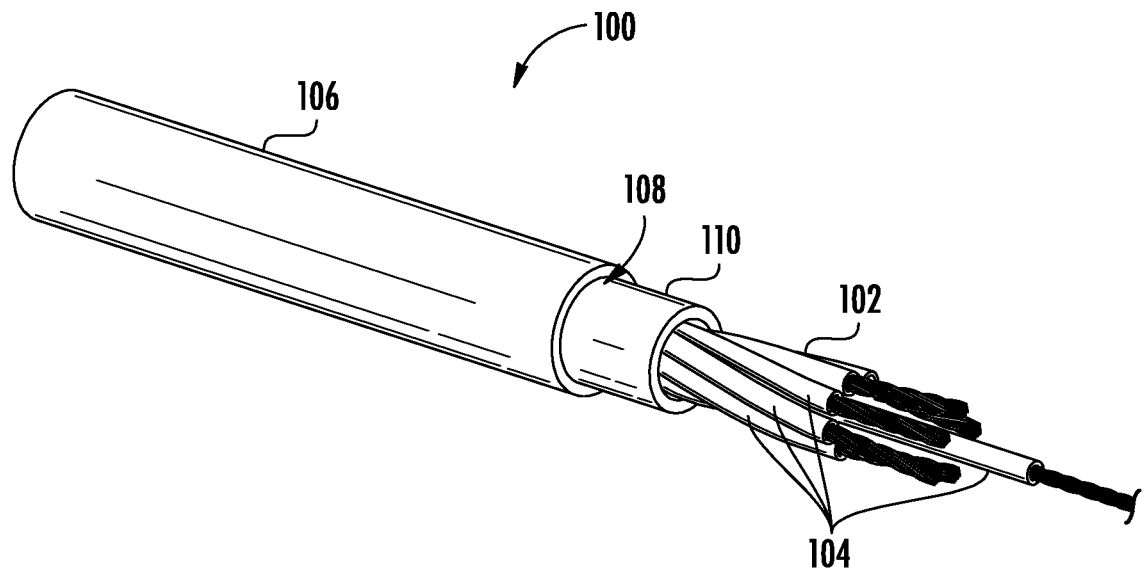
FIG. 1A is a perspective view of a section of fiber optic distribution cable, in accordance with aspects of the present disclosure.

Reference will now be made in detail to the present preferred embodiments, examples of which are illustrated in the accompanying drawings. Whenever possible, the same reference numerals will be used throughout the drawings to refer to the same or like parts.

The embodiments set out below represent the information to enable those skilled in the art to practice the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

REFERENCE NUMBERS AND TERMINOLOGY

The use herein of ordinals in conjunction with an element is solely for distinguishing what might otherwise be similar or identical labels, such as "first layer" and "second layer," and does not imply a priority, a type, an importance, or other attribute, unless otherwise stated herein.

The term "about" used herein in conjunction with a numeric value means any value that is within a range of ten percent greater than or ten percent less than the numeric value.

As used herein, the articles "a" and "an" in reference to an element refers to "one or more" of the element unless otherwise explicitly specified. The word "or" as used herein is inclusive unless contextually impossible. As an example, the recitation of A or B means A, or B, or both A and B.

The phrase "surface" as used herein refers to an outermost portion of an item, and includes a thickness of the outermost portion of the item. The precise thickness is generally not relevant to the embodiments, unless otherwise discussed herein. For example, a layer of material has a surface which includes the outermost portion of the layer of material as well as some depth into the layer of material, and the depth may be relatively shallow, or may extend substantially into the layer of material. The sub-wavelength openings discussed herein are formed in a surface, but whether the depth of the sub-wavelength openings extends past the depth of the surface is generally not relevant to the embodiments.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The use herein of "proximate" means at, next to, or near.

The terms "left," "right," "top," "bottom," "front," "back," "horizontal," "parallel," "perpendicular," "vertical," "lateral," "coplanar," and similar terms are used for convenience of describing the attached figures and are not intended to limit this disclosure. For example, the terms "left side" and "right side" are used with specific reference to the drawings as illustrated and the embodiments may be in other orientations in use. Further, as used herein, the terms "horizontal," "parallel," "perpendicular," "vertical," "lateral," etc., include slight variations that may be present in working examples.

As used herein, the terms "optical communication," "in optical communication," and the like mean that two elements are arranged such that optical signals are passively or actively transmittable therebetween via a medium, such as, but not limited to, an optical fiber, connectors, free space, index-matching structure or gel, reflective surface, or other light directing or transmitting means.

As used herein, the term "port" means an interface for actively or passively passing (e.g., receiving, transmitting, or both receiving and transmitting) optical signals. A port may include, by way of non-limiting examples, one or more collimators, pigtails, optical connectors, optical splices, optical fibers, free-space, or a combination of the foregoing. In the context of a WDM assembly, a port is the location at which one or more optical signals enters and/or exit the WDM assembly.

As used herein, the term "pigtail" means one or more optical fibers that extend from a ferrule. The one or more optical fibers may each be terminated with a fiber optical connector but are not required to be terminated with a fiber optic connector.

Data Centers and Fiber Optic Cable Assemblies

Figure 1B:
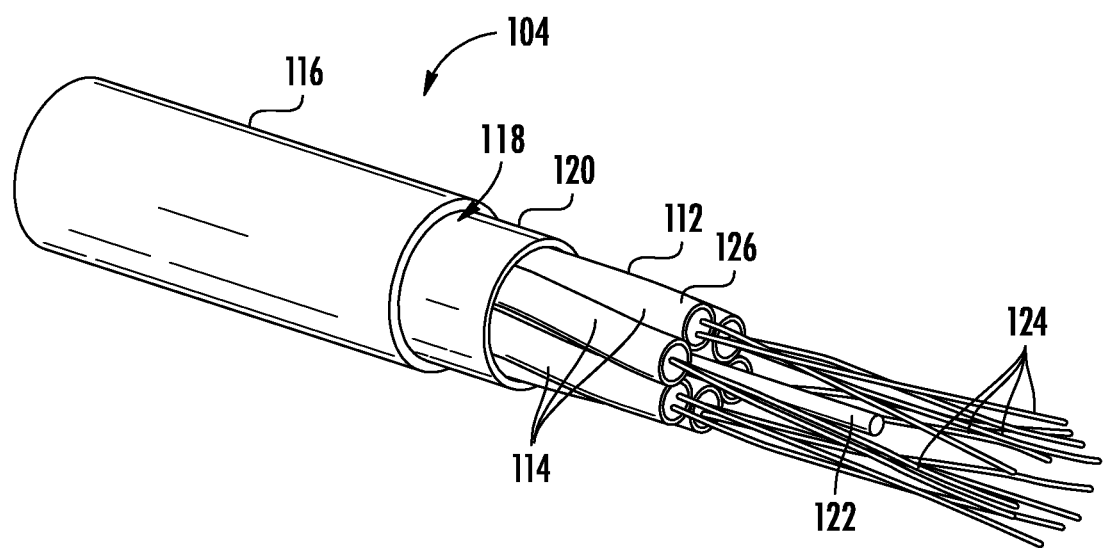
FIG. 1B is a perspective view of a section of a subunit cable of the distribution cable of FIG. 1A, in accordance with aspects of the present disclosure.

FIGS. 1A-1B are views of a section of a fiber optic distribution cable 100, in accordance with aspects of the present disclosure. Referring to FIG. 1A, the distribution cable 100 includes a cable bundle 102 (may also be referred to herein as a cable core) of a plurality of subunit cables 104 and a distribution jacket 106 (may also be referred to as outer jacket, etc.) defining a distribution interior 108. The cable bundle 102 of the subunit cables 104 is disposed in the distribution interior 108 of the distribution jacket 106. In certain embodiments, the distribution jacket 106 is formed from, for example, a flame-retardant polymer material.

In certain embodiments, a strain-relief component 110 may be disposed within the distribution interior 108 of the distribution jacket 106 between the cable bundle 102 of the subunit cables 104 and the distribution jacket 106. The strain-relief component 110 surrounds and/or is interspersed among the cable bundle 102 of the subunit cables 104. In certain embodiments, the strain-relief component 110 may be, for example, a layer of longitudinally-extending yarns for absorbing tensile loads on the cable bundle 102. In certain embodiments, the strain-relief component 110 includes a dispersed layer of aramid strands in the region between the distribution jacket 106 and the cable bundle 102 of subunit cables 104.

In the illustrated embodiment, the cable bundle 102 has eight subunit cables 104. However, other embodiments could include more or fewer subunit cables 104 depending on cabling requirements. In certain embodiments, one or more layers of subunit cables 104 may be provided depending on the fiber densities needed and/or other desired parameters (e.g., limitations on the outside diameter of the distribution cable 100). The distribution cable 100 and/or the subunit cables 104 may have generally circular cross-sections, although other cross-sections (e.g., oval, elliptical, etc.) may be used. The illustrated cables and subunit cables may not have perfectly circular cross-sections, and any citations of diameters may represent an average diameter of a generally circular cross-section. In certain embodiments, as illustrated, the cable bundle 102 is stranded such that the subunit cables 104 are helically twisted around a longitudinal axis of the cable bundle 102. In certain embodiments, an outer layer of a plurality of subunit cables 104 is stranded around an inner layer of subunit cables 104 to provide higher fiber densities. This reduces any stress or strain concentrations on any one subunit cable 104 (e.g., from bending of the distribution cable 100). In certain embodiments, a central strength element (not shown) may be provided and the subunit cables 104 may be stranded around the central strength element. In yet other cable applications, stranding may not be used and the subunit cables 104 may run substantially parallel through the distribution cable 100.

Referring to FIG. 1B, each subunit cable 104 (may also be referred to herein as a micromodule, etc.) includes a subunit bundle 112 (may also be referred to herein as a subunit core) of a plurality of tether cables 114 (may also be referred to herein as tether subunits) and a subunit jacket 116 defining a subunit interior 118. The subunit bundle 112 of the tether cable 114 is disposed in the subunit interior 118 of the subunit jacket 116. In certain embodiments, the subunit jacket 116 is formed from, for example, a flame-retardant polymer material.

In certain embodiments, a strain-relief component 120 may be disposed within the subunit interior 118 of the subunit jacket 116 between the subunit bundle 112 of the tether cables 114 and the subunit jacket 116. The strain-relief component 120 surrounds and/or is interspersed among the subunit bundle 112 of the subunit cables 104. In certain embodiments, the strain-relief component 120 may be, for example, a layer of longitudinally-extending yarns for absorbing tensile loads on the subunit bundle 112. In certain embodiments, the strain-relief component 120 includes a dispersed layer of aramid strands in the region between the subunit jacket 116 and the subunit bundle 112 of tether cables 114.

In certain embodiments, a central strength element 122 may be disposed in a center of the subunit bundle 112, and thereby within the subunit interior 118 of the subunit jacket 116. The tether cables 114 may be stranded (e.g., helically twisted) around the central strength element 122. In certain embodiments, an outer layer of a plurality of tether cables 114 is stranded around an inner layer of tether cables 114 to provide higher fiber densities. In yet other cable applications, stranding may not be used and the tether cables 114 may run substantially parallel through the subunit cable 104. The central strength element 122 provides strain-relief and absorbs loads from the tether cables 114.

In the illustrated embodiment, the subunit bundle 112 has six tether cables 114. However, other embodiments could include more or fewer tether cables 114 depending on cabling requirements. In certain embodiments, one or more layers of tether cables 114 may be provided depending on the fiber densities needed and/or other desired parameters (e.g., limitations on the outside diameter of the distribution cable 100). In certain embodiments, as illustrated, the subunit bundle 112 is stranded such that the tether cables 114 are helically twisted around a longitudinal axis of the subunit bundle 112. This reduces any stress or strain concentrations on any one tether cable 114 (e.g., from bending of the distribution cable 100 and/or subunit cable 104).

Each tether cable 114 includes one or more optical fibers 124 (may also be referred to herein as optical fiber waveguides). In certain embodiments, the optical fibers 124 in the subunit cable 104 may be furcated into separate tether cables 114 within the core of the subunit cable 104. Each tether cable 114 may include a tether jacket 126 to surround a select number of optical fibers 124 in the tether cable 114. As an example, as illustrated, each subunit cable 104 includes six tether cables 114, and each tether cable 114 includes two optical fibers 124. In other words, each subunit cable 104 includes 12 optical fibers 124. Other numbers of subunit cables 104, and/or tether cables 114, and/or optical fibers 124 can be employed for various applications, however. For example, in certain embodiments, each subunit cable 104 includes 2-24 optical fibers. Further, the diameters and thicknesses of the distribution cable 100, the subunit cables 104, and/or the tether cables 114 may vary according to the number of optical fibers 124 enclosed therein, and according to other factors.

In various embodiments, the distribution jacket 106, the subunit jacket 116, and/or the tether jacket 126 may be formed from an extrudable polymer material that includes one or more materials, additives, and/or components embedded in the polymer material that provides fire resistant characteristics, such as relatively low heat generation, low heat propagation, low flame propagation, and/or low smoke production. For example, the distribution jacket 106, the subunit jacket 116, and/or the tether jacket 126 may be made from a flame-retardant PVC. In various embodiments, the fire resistant material may include an intumescent material additive embedded in the polymer material. In other embodiments, the fire resistant material may include a non-intumescent fire resistant material embedded in the polymer material, such as a metal hydroxide, aluminum hydroxide, magnesium hydroxide, etc., that produces water in the presence of heat/fire which slows or limits heat transfer along the length of the distribution cable 100, subunit cables 104, and/or tether cables 114. In certain embodiments, the distribution jacket 106, the subunit jacket 116, and/or the tether jacket 126 may be formed from fire-retardant materials to obtain a desired plenum burn rating. For example, highly-filled PVCs of specified thicknesses can be used to form these components. Other suitable materials include low smoke zero halogen (LSZH) materials such as flame retardant polyethylene and PVDF.

In certain embodiments, the strain-relief component 110 and/or strain-relief component 120 may utilize tensile yarns as tension relief elements that provide tensile strength to the cables 100, 104, 114. In certain embodiments, a preferred material for the tensile yarns is aramid (e.g., KEVLAR®), but other tensile strength materials could be used, such as high molecular weight polyethylenes (e.g., SPECTRA® fiber and DYNEEMA® fiber, Teijin Twaron® aramids, fiberglass, etc.). In certain embodiments, the yarns may be stranded to improve cable performance.

The components of the distribution cable 100, such as the subunit cables 104, can be constructed of selected materials of selected thicknesses such that the distribution cable 100 achieves plenum burn ratings according to desired specifications. The subunit cables 104 can also be constructed so that they are relatively robust, such that they are suitable for field use, while also providing a desired degree of accessibility. For example, in certain embodiments, the subunit cables 104 can be constructed with thicker subunit jackets 116 which provide sufficient protection for the fibers such that the subunit jackets 116 may be used as furcation legs.

Figure 2A:
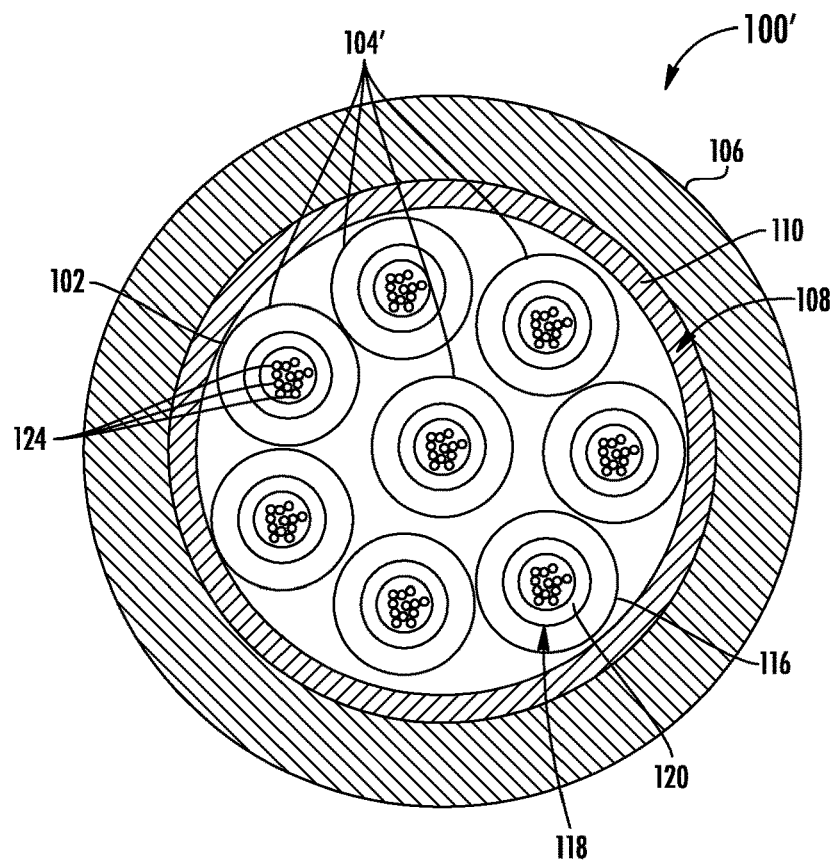
FIG. 2A is a cross-sectional view of an embodiment of the distribution cable of FIGS. 1A-1B, in accordance with aspects of the present disclosure.

FIG. 2A is a cross-sectional view of an embodiment of the distribution cable 100' of FIGS. 1A-1B, in accordance with aspects of the present disclosure. Each of the subunit cables 104' includes optical fibers 124 loosely disposed within the subunit cable 104' (e.g., in an essentially parallel array). In certain embodiments, the optical fibers 124 may be coated with a thin film of powder (e.g., chalk, talc, etc.) which forms a separation layer that prevents the fibers from sticking to the molten sheath material during extrusion. The subunit cable 104' may be further encased in an interlocking armor for enhanced crush resistance.

Figure 2B:
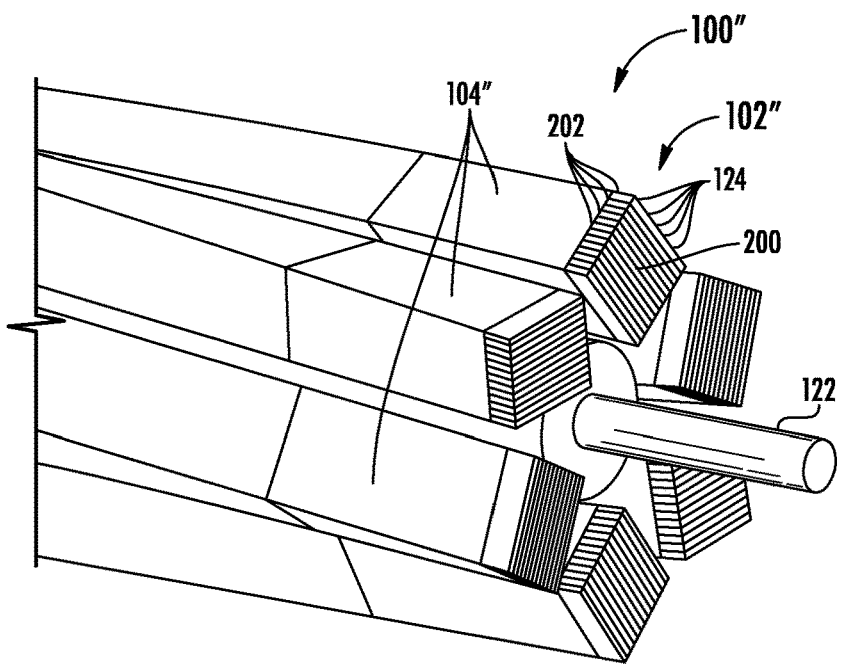
FIG. 2B is a cross-sectional view of another embodiment of the distribution cable of FIGS. 1A-1B, in accordance with aspects of the present disclosure.

FIG. 2B is a cross-sectional view of another embodiment of the distribution cable 100". Each of the subunit cables 104" of the cable bundle 102" is a stack 200 of fiber ribbons 202. Each fiber ribbon 202 includes a plurality of optical fibers 124. In certain embodiments, as illustrated, the subunit cables 104" are stranded around a central strength element 122, and/or each subunit cable 104" is stranded.

Figure 3A:
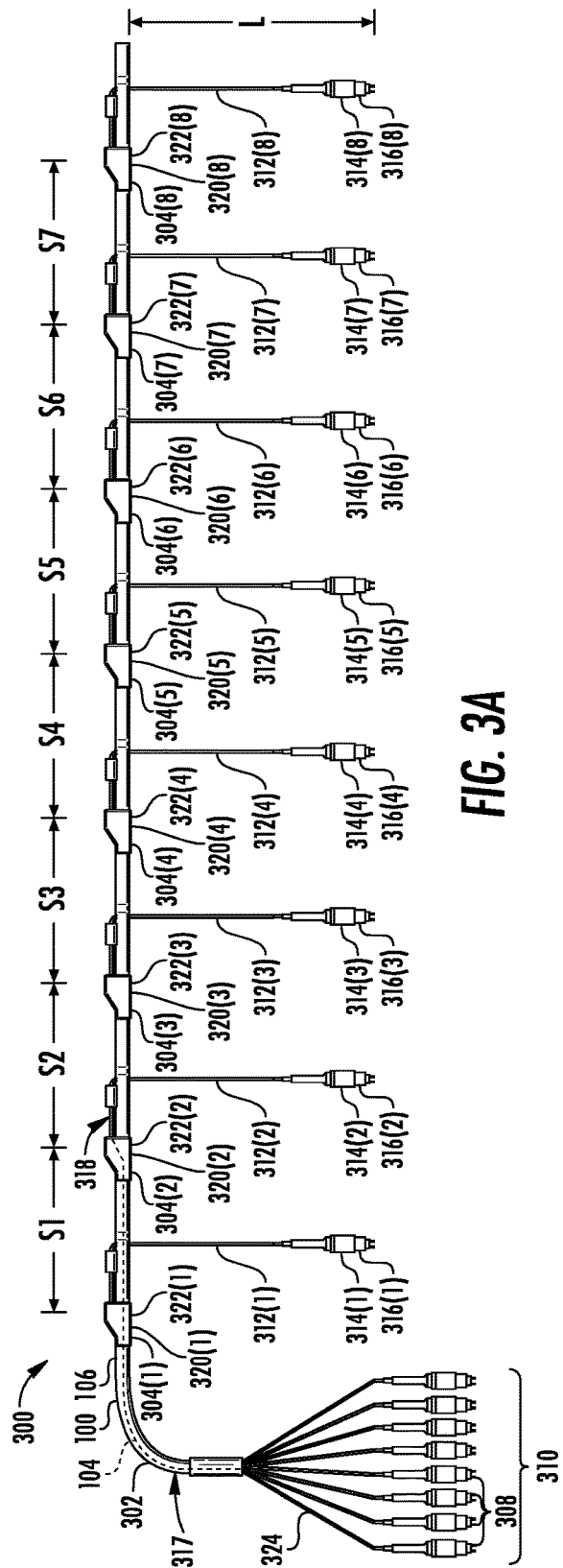
FIG. 3A is a schematic view of an embodiment of a preconnectorized distribution cable assembly including the distribution cable of FIGS. 1A-2B and illustrating a distribution tether with MTP connectors and eight subunit cables with MTP connectors.
Figure 3B:
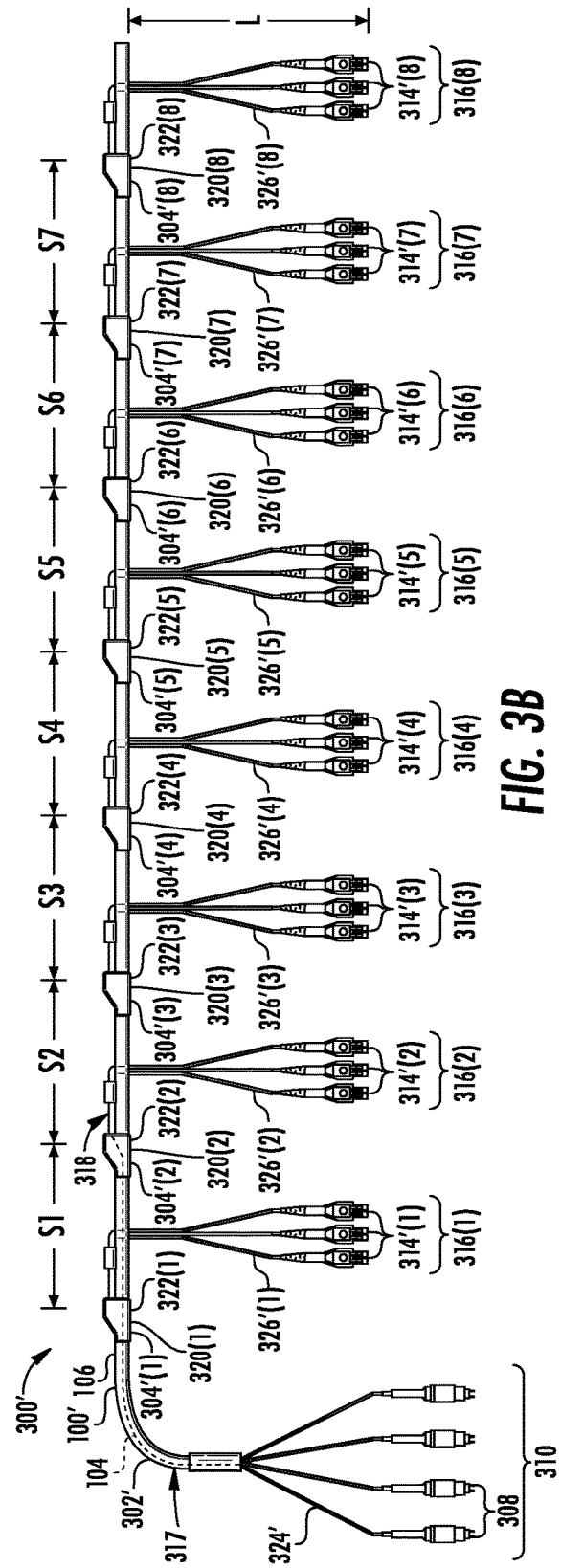
FIG. 3B is a schematic view of another embodiment of a preconnectorized distribution cable assembly including the distribution cable of FIGS. 1A-2B and illustrating a distribution tether with MTP connectors and eight tether subunits with LC uniboot connectors.
Figure 3C:
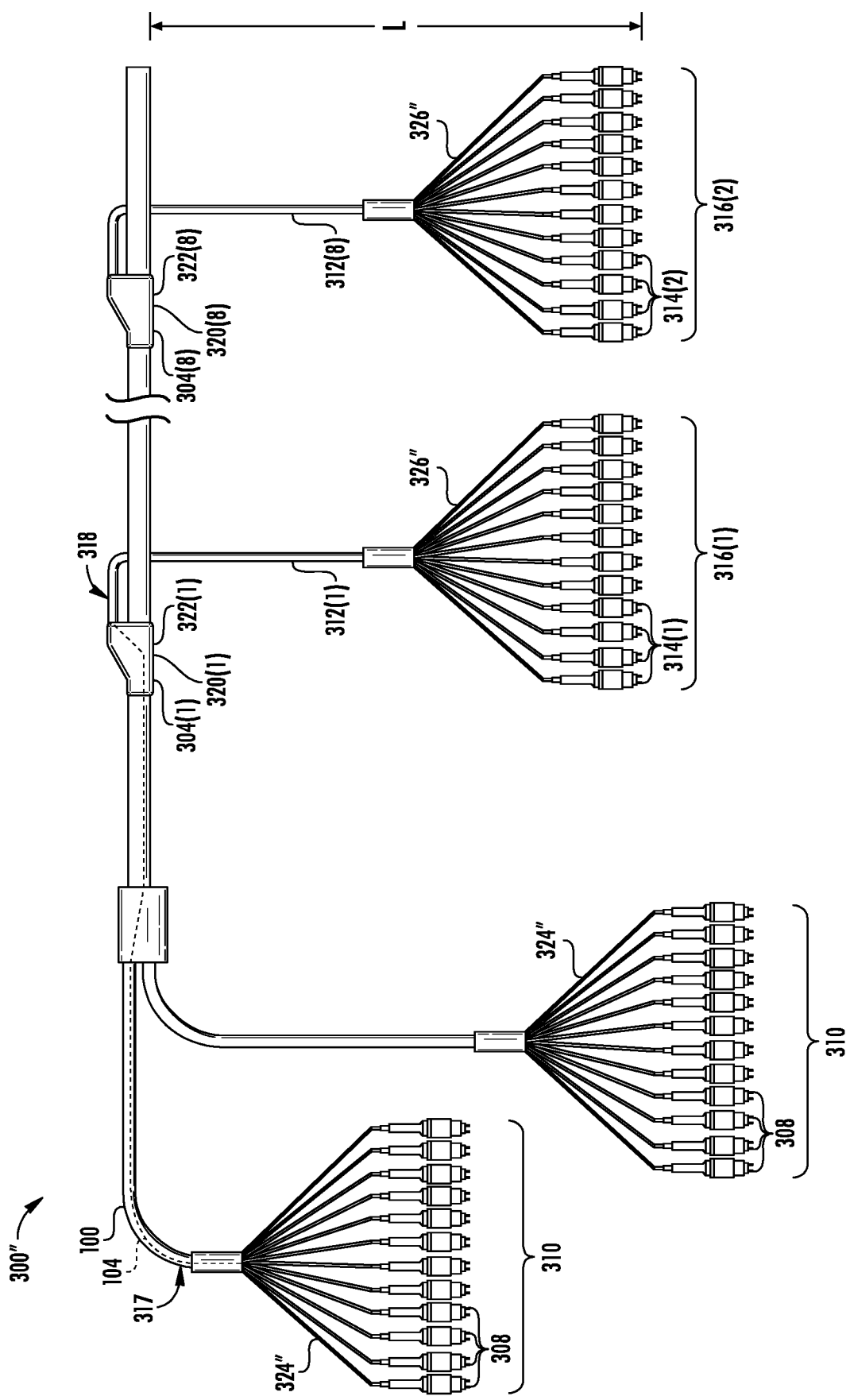
FIG. 3C is a schematic view of another embodiment of a preconnectorized distribution cable assembly including the distribution cable of FIGS. 1A-2B and illustrating multiple distribution tethers and multiple tap tethers.

FIGS. 3A-3C are embodiments of a distribution cable assembly 300 incorporating the distribution cable of FIGS. 1A-2B. Referring to FIG. 3A, the distribution cable assembly 300 includes a distribution subunit 302 (may also be referred to herein as a main subassembly) and a plurality of tap subunits 304(1)-304(8) (may also be referred to herein as a branch subassembly, drop subunit, etc.). The distribution subunit 302 includes a distribution cable 100, 100' (referred to generally herein as distribution cable 100) and distribution connectors 308(1)-308(8) at a distribution end 310 (may also be referred to herein as upstream end). Each of the plurality of tap subunits 304(1)-304(8) includes a tap cable 312(1)-312(8) (may also be referred to herein as a drop cable) and tap connectors 314(1)-314(8) at a tap end 316(1)-316(8) (may also be referred to herein as downstream end). In certain embodiments, subunit cables 104 extend from the distribution connector 308 to respectively one of the plurality of tap connectors 312(1)-312(8), each at a different tap point 320(1)-320(8) (may also be referred to herein as drop point, terminated access point, etc.) along a length of the distribution cable 100. For example, subunit cable 104 extends from the distribution connector 308 through the distribution cable 100 to the tap connector 314(2). The spacing between tap points 320(1)-320(8) depends on the application and cabling requirements.

The distribution connectors 308(1)-308(8) are in optical communication with the tap connectors 314(1)-314(8) (may be referred to generally as tap connectors 314), where the distribution cable assembly 300 is pre-connectorized, such as for connection to a patch panel (e.g., at a goalpost). Any conventional or yet-to-be developed optical connector or connectorization scheme may be used in accordance with the present disclosure, including, but not limited to, small (e.g., LC) and multi-fiber (e.g., MPO/MTP) connectors as commercially available. The distribution cable assembly 300 includes a distribution portion 317 of the subunit cable 104 that extends from the distribution connectors 308(1)-308(8) through the distribution cable 100. The distribution cable assembly 300 further includes tap portions 318(1)-318(8) of the subunit cable 104 that extends from the distribution cable 100 to the tap connectors 312(1)-312(8). A junction shell 322(1)-322(8) at each tap point 320(1)-320(8) facilitates and protects routing of the subunit cable 104 from the distribution cable 100.

In certain embodiments, as illustrated in FIG. 3A, the distribution subunit 302 includes a distribution tether 324 at the distribution end 310. The distribution tether 324 may be pre-connectorized, and extend a predetermined length L from the distribution jacket 106. Further, the distribution tether 324 includes distribution connectors 308(1)-308(8) coupled to ends of the distribution tether 324. Whether to include a distribution tether 324 may depend on the cabling requirements (e.g., routing requirements, connector requirements, etc.). Similarly, the tap subunits 304(1)-304(8) are pre-connectorized such that the tap cables 312(1)-312(8) extend a predetermined length L from the distribution jacket 106. Further, the tap subunits 304(1)-304(8) include tap connectors 312(1)-312(8) coupled to an end of the tap subunits 304(1)-304(8). In certain embodiments, each of the distribution connectors 308(1)-308(8) and/or tap connectors 314(1)-314(8) includes an MPO (multi-fiber push on) connector, which is configured for multi-fiber cables including multiple sub-units of optical fibers (e.g., between four to 24 fibers). A type of MPO connector may be an MTP connector that may hold 12 fibers and is commercially available by US CONEC LTD. of Hickory, North Carolina. MPO connectors may hold 12 fibers, 24 fibers, 36 fibers, or 96 fibers, or another number as suitable per the design parameters for the pre-configured cable.

In certain embodiments, as illustrated in FIG. 3B, the distribution cable assembly 300' includes the distribution subunit 302' with a distribution tether 324' at the distribution end 310, which is pre-connectorized with MPO connectors. Further, the tap subunits 304'(1)-304'(8) includes tap tethers 326'(1)-326'(8) at the tap ends 316'(1)-316'(8), which is pre-connectorized with tap connectors 314'(1)-314'(8) including LC connectors. An LC connector may include a simple design for a single optical fiber for transmission in a single direction (e.g., transmit or receive) or when a multiplex data signal is used for bi-directional communication over a single optical fiber. An LC connector may alternatively use a duplex design including connection to a pair of optical fibers for when separate transmit and receive communications are required between devices, for example.

FIG. 3C is a schematic view of another embodiment of a preconnectorized distribution cable assembly 300" illustrating multiple distribution tethers 324" and multiple tap tethers 326". Such configurations may be used to increase fiber density and/or for certain routing configurations, such as by routing each distribution tether 324" to each tap tether 326".

Figure 4A:
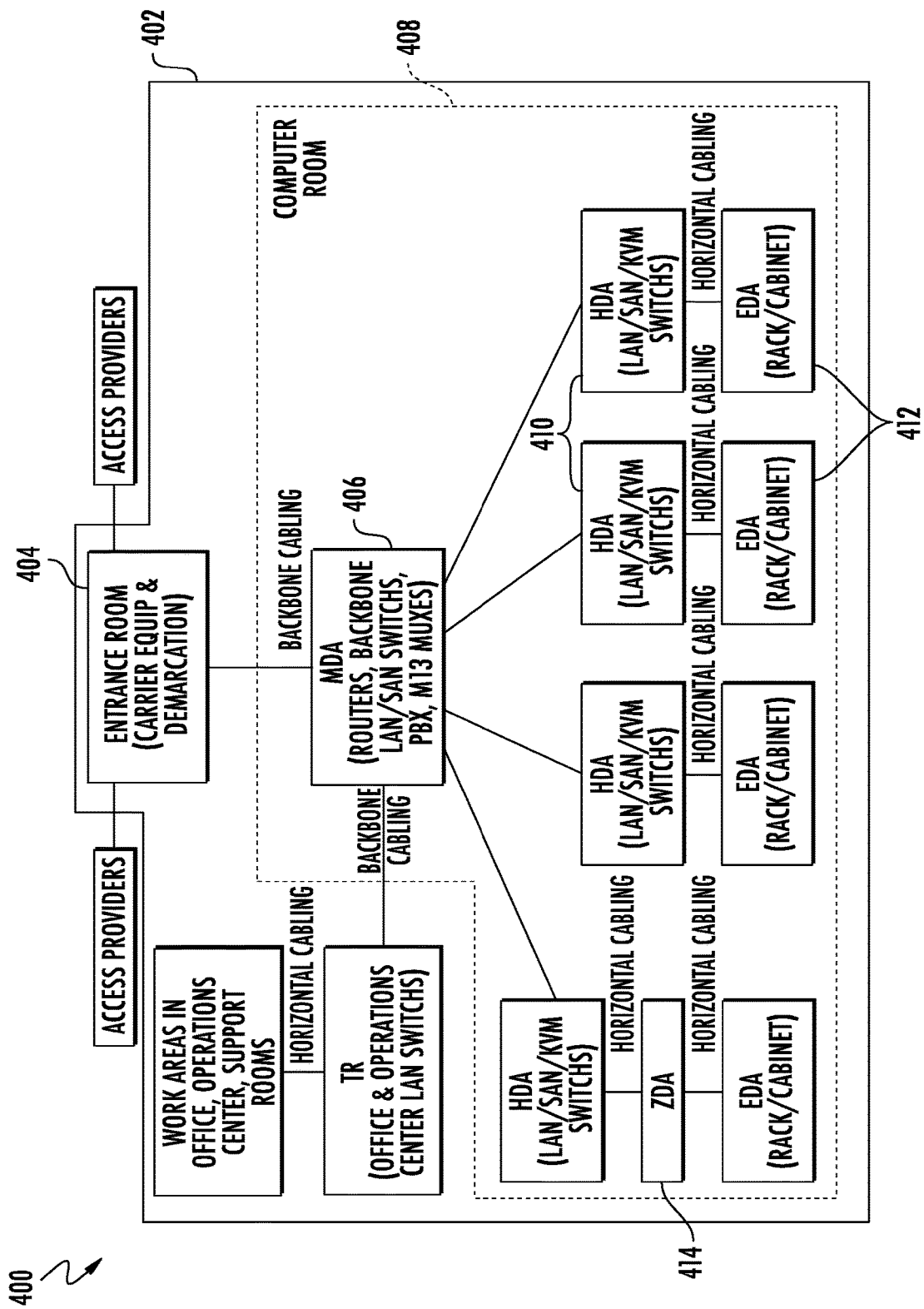
FIG. 4A is a schematic view of a data center for use with the distribution cable assemblies of FIGS. 3A-3C, in accordance with aspects of the present disclosure.

FIG. 4A is a schematic view of a data center, in accordance with aspects of the present disclosure. In particular, FIG. 4A illustrates a topology of an exemplary data center 400. The data center 400 includes a set of spaces delineated by function which may be housed in a single building 402. For example, the data center may include one or more entrance rooms 404 or entry points. The entrance room 404 is conventionally the space used for interfacing the structured cabling infrastructure of the data center 400 with inter-building cabling. Each entrance room 404 may be configured to act as a termination point for external optical connections to a wide area network (WAN) and/or other data center buildings 400. The data center 400 may optionally have multiple entrance rooms 404 to provide redundancy or to avoid exceeding maximum cable lengths. The entrance room 404 may contain carrier equipment and serve as the demarcation between that carrier equipment and the data center.

The entrance room 404 communicates with a Main Distribution Area (MDA) 406. The MDA 406 may be separately contained in a dedicated computer room 408. In some cases, the entrance room 404 may be combined with the MDA 406. The MDA 406 is the central point of distribution for the data center structured cabling system. Core routers, core Local Area Network (LAN) switches, core Storage Area Network (SAN) switches, and Private Branch eXchange (PBX) may be located in the MDA 406. The MDA 406 may serve one or more Horizontal Distribution Areas (HDAs) 410 or Equipment Distribution Areas (EDAs) 412. The HDA 410 may include LAN switches, SAN switches, and Keyboard/Video/Mouse (KVM) switches for equipment located in the EDAs 412. In a small data center, the MDA 406 may serve the EDAs 412 directly with no HDAs 410. However, most data centers, particularly large data centers, will have multiple HDAs 410. The EDA 412 contains the end equipment, including computer systems and telecommunications equipment typically organized in racks or cabinets. In some cases, a Zone Distribution Area (ZDA) 414 may be provided between the HDA 410 and the EDA 412 to provide for frequent reconfiguration and flexibility.

The cabling topology for a data center includes many different types of cabling, such as high fiber count cables (e.g., 3,000+ fibers) coming into the data center and all the structured cabling to connect all of the switches and equipment internal to the data center. The data center structured cabling may be categorized as backbone cabling and horizontal cabling.

Figure 4B:
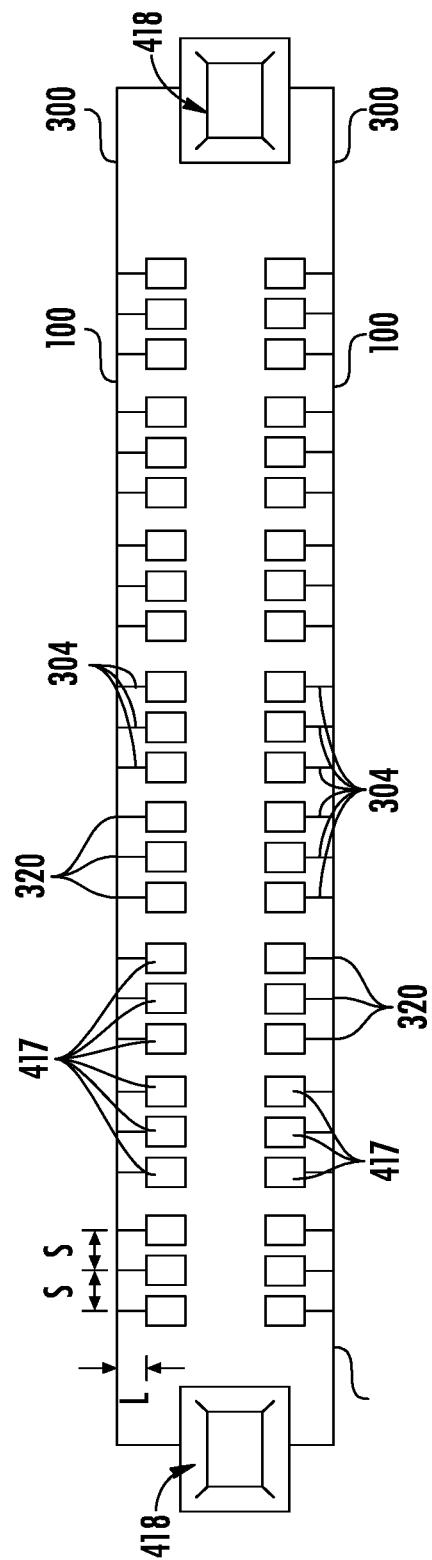
FIG. 4B is a schematic view of equipment racks and distribution cables in the data center of FIG. 4A, in accordance with aspects of the present disclosure.

FIG. 4B is a schematic view of equipment racks and distribution cables in a data center, in accordance with aspects of the present disclosure. A pre-configured and preconnectorized cable such as distribution cable assembly 300, 300', 300" (referred to herein generally as distribution cable assembly 300) may be used to connect the servers 417 in the racks or cabinets in the EDA 412 to the MDA via one or more edge of rack units 418 (also referred to as goalposts). The exact drop or tap locations and run lengths for the individual tap subunits 304, 304', 304" (referred to herein generally as tap subunit 304) may be pre-engineered and pre-connectorized to replace the many individual cables typically provided. In conventional systems, each cabinet would require a different cable. Comparatively, disclosed herein are distribution cable assemblies 300 with a single distribution cable 100 with multiple tap points 320, thereby greatly reducing cabling clutter and simplifying installation.

The most efficient optical infrastructure is one in which all or most of the components are preterminated in the factory and the cables are designed to fit efficiently in the confined spaces of the datacenter without excess cable. In certain embodiments, all connectors are installed and tested in the factory and packaged such that components are not damaged during installation. The installer simply unpacks the components, pulls the preconnectorized cable assembly into place, snaps in all of the connectors and the system is up and running. Accordingly, the cable assembly 300, 300', 300" depicted in FIGS. 1A-3C may be particularly suitable for the structured cabling requirements of a datacenter.

In certain embodiments, the plurality of tap subunits 304 (e.g., premanufactured) of the distribution cable assembly 300 are spaced apart by a predetermined distance S and/or of a predetermined length L based on, for example, location in a datacenter and/or distance to specific equipment, etc. In particular, the distribution cable assembly 300 could be manufactured such that each individual tap subunit 304 has a predetermined length L according to the configuration of the data center and where along the distribution cable 100 the tap subunit 304 will branch away. Further, the tap units 304 may be premanufactured such that each has a predetermined length L according to the configuration of the data center (e.g., spacing S between servers) and location along the distribution cable.

Although the concepts of the present disclosure are described herein with primary reference to a data center, it is contemplated that the concepts will enjoy applicability to any outdoor and indoor waveguide system associated with digital infrastructure data including an infrastructure layout and housing server rack systems. For example, and not by way of limitation, it is contemplated that the concepts of the present disclosure will enjoy applicability to indoor warehouses and/or commercial buildings.

Methods of Making Preconnectorized Cable Assemblies

Figure 5A:
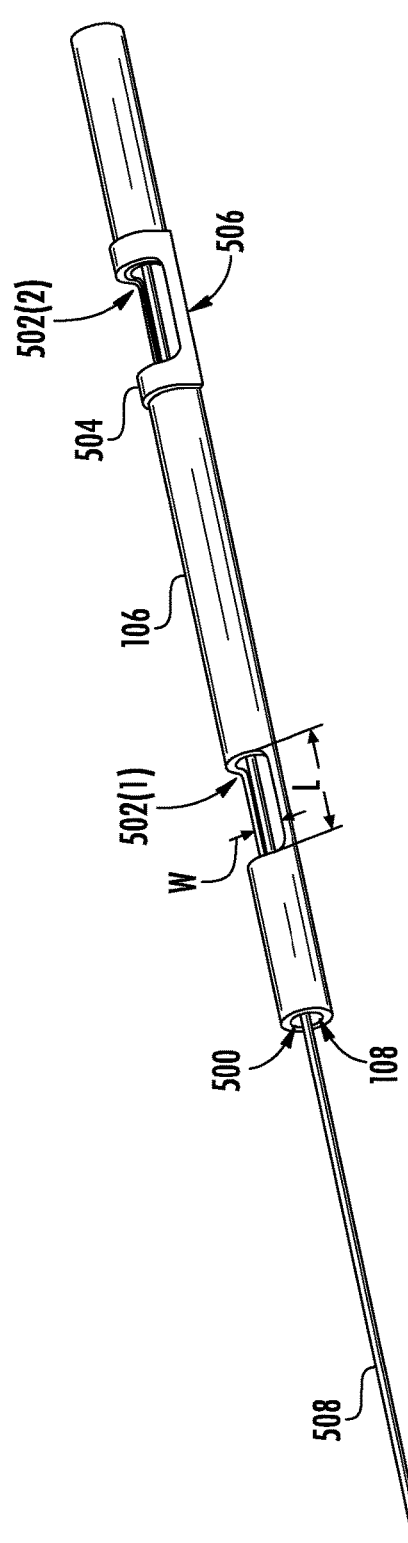
FIG. 5A is a perspective view of a step of making a distribution cable assembly of FIGS. 3A-3C including positioning a pull string within a distribution cable, in accordance with aspects of the present disclosure.
Figure 5B:
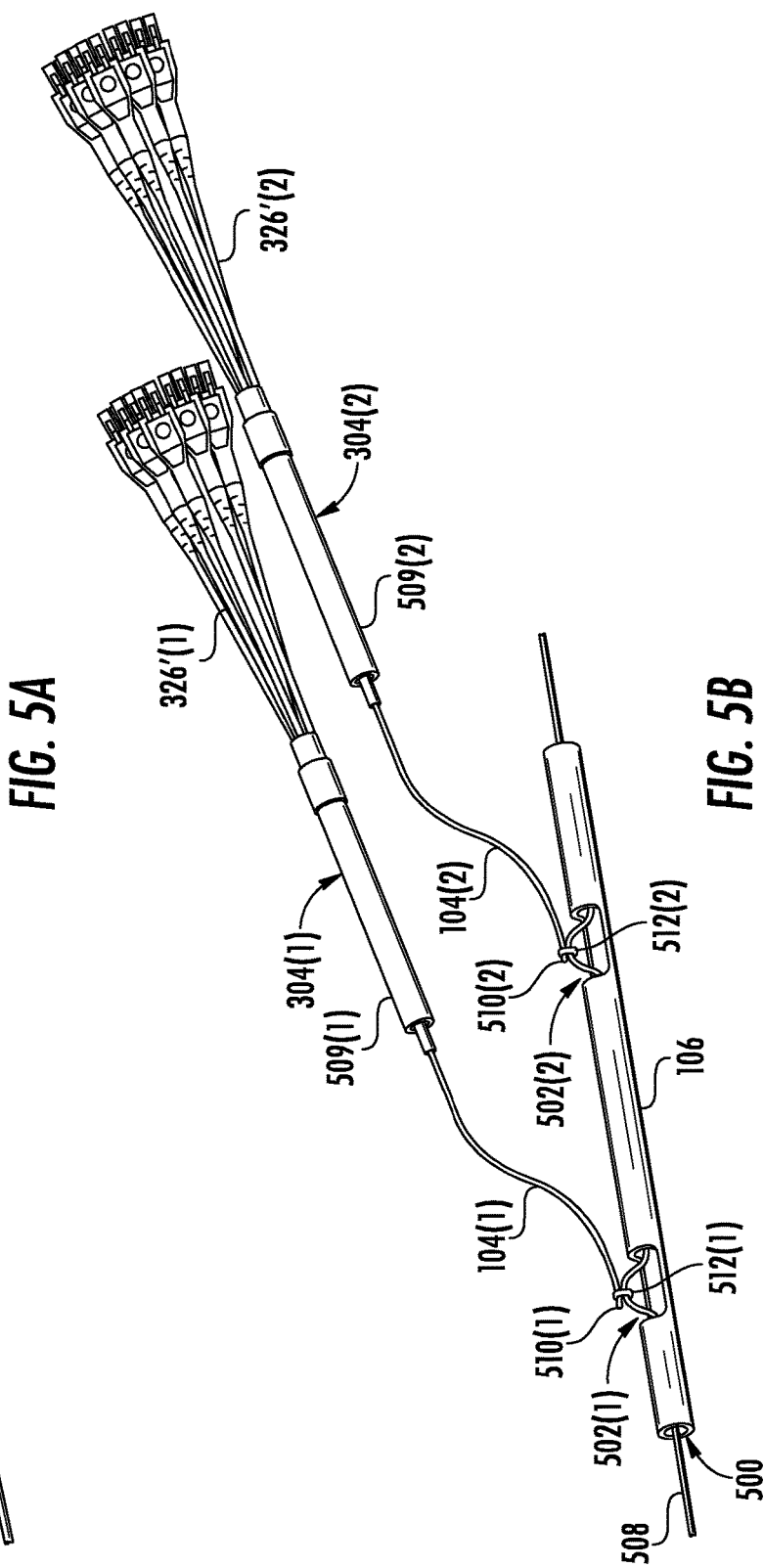
FIG. 5B is a perspective view of another step of making the cable assembly of FIGS. 3A-3C including attaching subunit cables to the pull string through side openings of the jacket of the distribution cable, in accordance with aspects of the present disclosure.
Figure 5C:
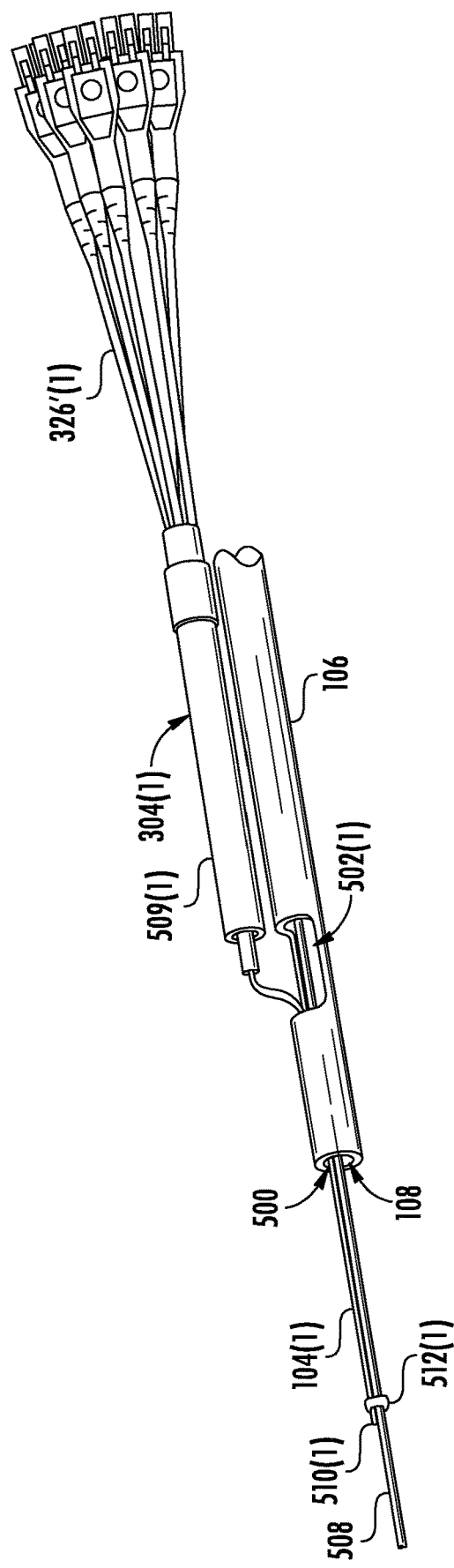
FIG. 5C is a perspective view of another step of making the cable assembly of FIGS. 3A-3C including pulling distribution ends of the subunit cables through the distribution cable via the pull string, in accordance with aspects of the present disclosure.

FIGS. 5A-5C are views of making a distribution cable assembly by attaching to and pulling of a pull string. Referring to FIG. 5A, a distribution jacket 106 of a distribution cable 100 (see FIG. 1A) has a distribution end opening 500 at one end of the distribution jacket 106. The distribution jacket 106 defines a distribution interior 108 therein.

A plurality of side openings 502(1)-502(2) (referred to generally as side openings 502) are cut in the distribution jacket 106. The side openings 502 may be formed by any of a variety of suitable methods. In certain embodiments, a cutting guide 504 (e.g., molded plastic) is placed over the distribution jacket 106 and a cutting string follows the shape of the opening 506 of the cutting guide 504 into the distribution jacket 106. The cutting guide 504 has a greater hardness than the distribution jacket 106 so that the cutting string cuts into the distribution jacket 106 instead of the mold. In certain embodiments, a tool cuts perpendicularly into a side of the distribution jacket 106.

In certain embodiments, the side opening 502 extends only partially circumferentially around the distribution jacket 106 to increase the torsional strength of the distribution jacket 106. Each side opening 502 includes an axial length AL and a width W (no greater than the diameter of the distribution jacket 106). The axial length AL and/or width W may vary depending on the application, and the optical fiber requirements (e.g., minimum bend radius, etc.). However, in certain embodiments, the axial length AL and/or width W is the same for each side opening 502 to simplify manufacturing and/or decrease time, effort, and/or costs. In certain embodiments, the side opening 502 is scallop shaped so that there are no angles/vertices in the shape of the perimeter of the side opening 502. This prevents stress concentrations and weak points in the distribution jacket 106 (e.g., cracking).

A pull string 508 is positioned in the distribution interior 108 and axially extends along the distribution interior 108 to extend out and/or proximate the distribution end opening 500. Portions of the pull string 508 are accessible through the side openings 502.

Referring to FIG. 5B, a first distribution end 510(1) of a first subunit cable 104(1) of a first tap subunit 304(1) is attached to the pull string 508 through the first side opening 502(1). In other words, an optical fiber of the first tap subunit 304(1) is attached to the pull string 508 through the first side opening 502(1). In certain embodiments, the first subunit cable 104(1) is attached to the pull string 508 by a first clip 512(1). Similarly, a second distribution end 510(2) of a second subunit cable 104(2) of the second tap subunit 304(2) is attached to the pull string 508 through the second side opening 502(2). In other words, an optical fiber of the second tap subunit 304(2) is attached to the pull string 508 through the second side opening 502(2). In certain embodiments, the second subunit cable 104(2) is attached to the pull string 508 by a second clip 512(2). Accordingly, the spacing S between the side openings 502 is about the same as the spacing between the first attachment to the pull string 508 and the second attachment to the pull string 508. This process can be repeated for any number of side openings 502 and/or any number of subunit cables 104, etc. In certain embodiments, each tap subunit 304(1)-304(2) includes a tap jacket 509(1)-509(2) (may also be referred to herein as a furcation tube).

Each of the first tap subunit 304(1) and the second tap subunit 304(2) is preconnectorized before assembly to the distribution jacket 106 to include a tap tether 326'(1)-326'(2) and/or a tap jacket 509(1)-509(2). However, it is noted that, as discussed above, other tap subunit 304(1) (1)-304(2) configurations could be used. Further, as noted below, in certain embodiments, the subunit cables 104(1)-104(2) are connectorized after assembly to the distribution jacket 106.

Referring to FIG. 5C, pulling the pull string 508 through the distribution interior 108 and/or out of the distribution end opening 500 also draws the first distribution end 510(1) of the first subunit cable 104(1) and, simultaneously, the second distribution end 510(2) of the second subunit cable 104(2) (not shown). As illustrated, the pull string 508 is pulled until the distribution end 510(1) is past the distribution end opening 500 and exterior to the distribution jacket 106.

FIGS. 6A-6D are views illustrating pulling of the pull string 508 to simultaneously pull distribution ends 510(1)-510(3) of the subunit cables 104(1)-104(3) through the interior 108 of the distribution jacket 106. The subunit cables 104 are fed from reels 600(1)-600(3), however, the same principles and features discussed with respect to FIGS. 6A-6D would also apply to the configuration of the tap subunits 304(1)-304(2) of FIGS. 5A-5C. In particular, each of the subunit cables 104(1)-104(3) are attached to the pull string 508 through a respective one of the side openings 502(1)-502(3). The pull string 508 being positioned in the interior 108 of the distribution jacket 106 and extending from the distribution end opening 500 through the interior 108 to the last side opening 502(3).

Referring to FIG. 6B, the pull string 508 is partially pulled through the interior 108 and out of the distribution end opening 500 (e.g., the same spacing as between the side openings 502). The distribution ends 510(1)-510(3) of the subunit cables 104(1)-104(3) are simultaneously pulled through the interior 108 as well. However, only the first distribution end 510(1) has moved past the distribution end opening 500 and is exterior to the distribution jacket 106.

Referring to FIG. 6C, the pull string 508 is pulled until the distribution ends 510(2)-510(3) of all the subunit cables 104(1)-104(3) extend past the distribution end opening 500 of the distribution jacket 106 and are exterior to the distribution jacket 106.

Referring to FIG. 6D, once the last distribution end 510(3) of the subunit cable 104(3) has been pulled out of the distribution end opening 500 of the distribution jacket 106, all of the subunit cables 104(1)-104(3) are cut to form new distribution ends 510(1)-510(3) proximate the distribution end opening 500. Doing so removes the extra slack from the other subunit cables 104(1)-104(3). Further, all of the subunit cables 104(1)-104(3) are cut from their respective reels 600(1)-600(3) to form termination ends 602(1)-602(3) of the subunit cables 104.

Compared to some other methods of manufacture, such an assembly is easy to perform and/or reduces waste (e.g., removes or minimizes dead fiber within the distribution jacket 106).

In certain embodiments, the distribution ends 510(1)-510(3) of the subunit cables 104(1)-104(3) are not attached to the pull string 508, but instead are pushed through the distribution jacket 106. In particular, in certain embodiments, distribution ends 510(1)-510(3) of subunit cables 104(1)-104(3) are inserted, respectively, through side openings 502(1)-502(3) in the distribution jacket 106 of a distribution cable 100 and pushed through the distribution jacket 106 to the distribution end opening 500. For example, in certain embodiments, a distribution end 510 of a first subunit cable 104(1) is inserted through a first side opening 502(1) in the distribution jacket 106 of a distribution cable 100. The first subunit cable 104(1) includes at least one optical fiber 124. The distribution end 510 of the first subunit cable 104(1) is then pushed (or otherwise fed) through the distribution jacket 106 of the distribution cable 100 with at least a portion of the first subunit cable 104(1) extending through a distribution end opening 500 of the distribution jacket 106. A distribution end 510 of a second subunit cable 104(2) is inserted through a second side opening 502(2) in the distribution jacket 106 of the distribution cable 100. The second subunit cable 104(2) includes at least one optical fiber 124. The distribution end 510 of the second subunit cable 104(2) is pushed (or otherwise fed) through the distribution jacket 106 of the distribution cable 100 with at least a portion of the second subunit cable 104(2) extending through a distribution end opening 500 of the distribution jacket 106. As noted above, in certain embodiments, a tap end 316 of the first subunit cable 104(1) is preconnectorized before pushing the distribution end 510 of the first subunit cable 104(1).

Figure 7:
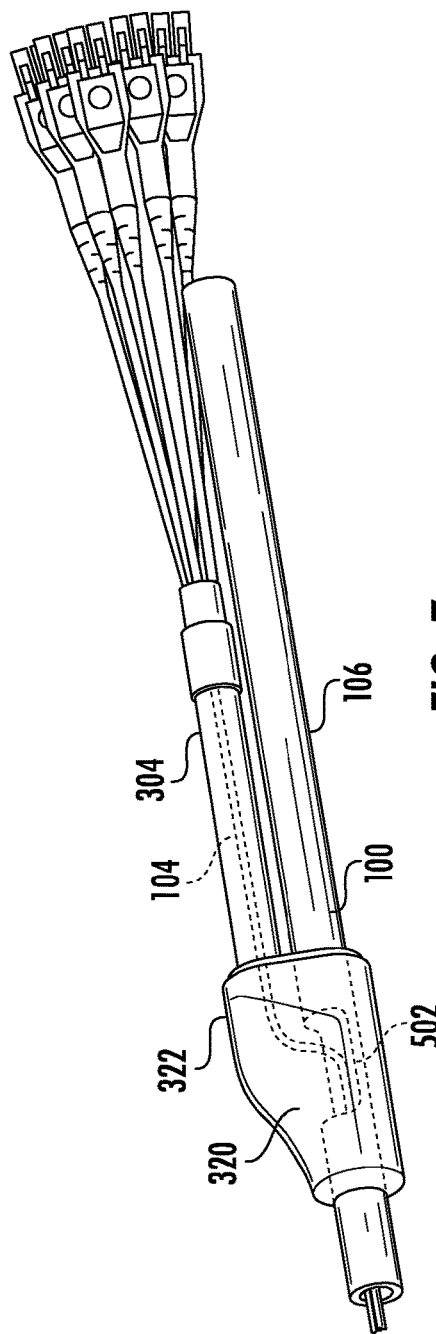
FIG. 7 is a perspective view of attachment of a junction shell to cover the junction of the subunit cable with the jacket of the distribution cable of FIGS. 1A-3C, in accordance with aspects of the present disclosure.

FIG. 7 is a perspective view of attachment of a junction shell 322 to cover the junction of the subunit cable 104 with the distribution jacket 106 of the distribution cable 100, in accordance with aspects of the present disclosure. The tap subunits 304 may be connectorized before pulling the pull string 508 (as in FIGS. 5A-5C) or after pulling the pull string 508 (as in FIGS. 6A-6D). Regardless, a junction shell 322 may be applied to cover the side openings 502 at each tap point 320.

Figure 8:
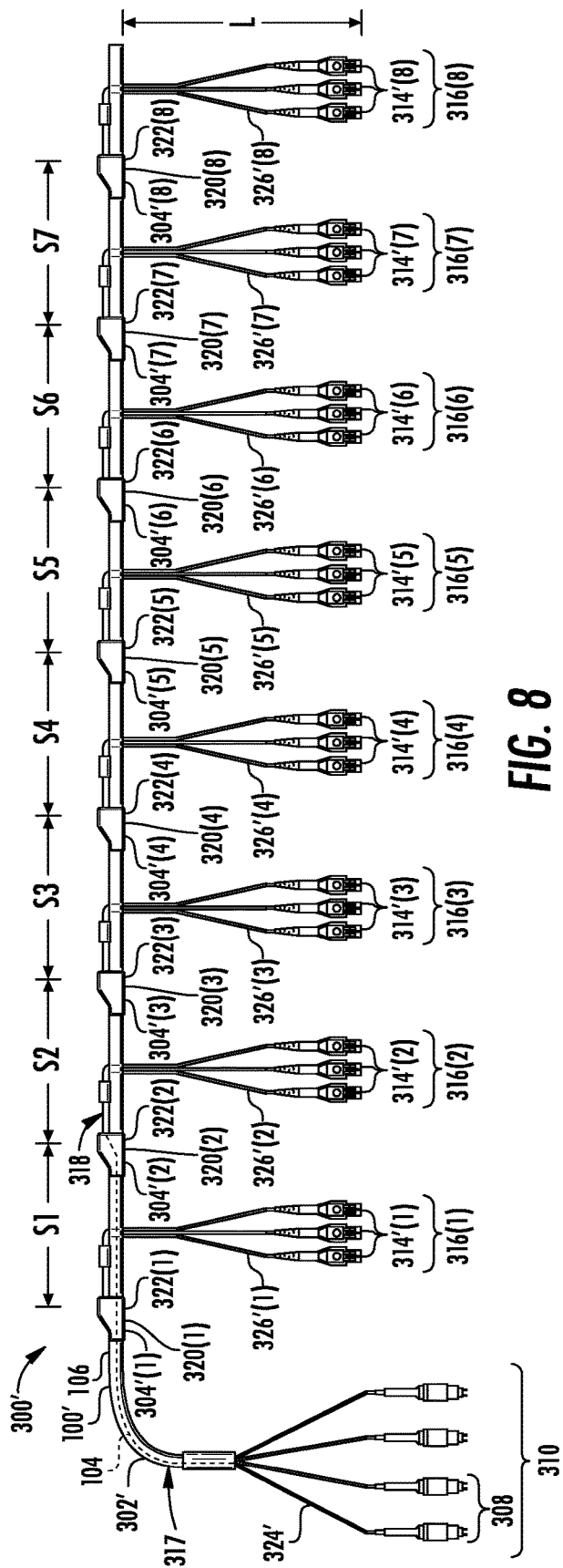
FIG. 8 is a perspective view of a preconnectorized distribution cable assembly made by the method of FIGS. 5A-7, in accordance with aspects of the present disclosure.

FIG. 8 is a perspective view of a preconnectorized distribution cable assembly 100' made by the method of FIGS. 5A-7. However, the distribution cable assembly 100' is merely illustrative, and the method described herein can be used to make any type of distribution cable assembly, such as the distribution cable assemblies 300-300"' of FIGS. 3A-3C. The distribution cable assembly 100' can be any length and with any number of tap points 320 and/or tap subunits 304. The distribution cable 100' comprises a plurality of side openings, each of the plurality of side openings covered by one of a plurality of junction shells 322.

Figure 9A:
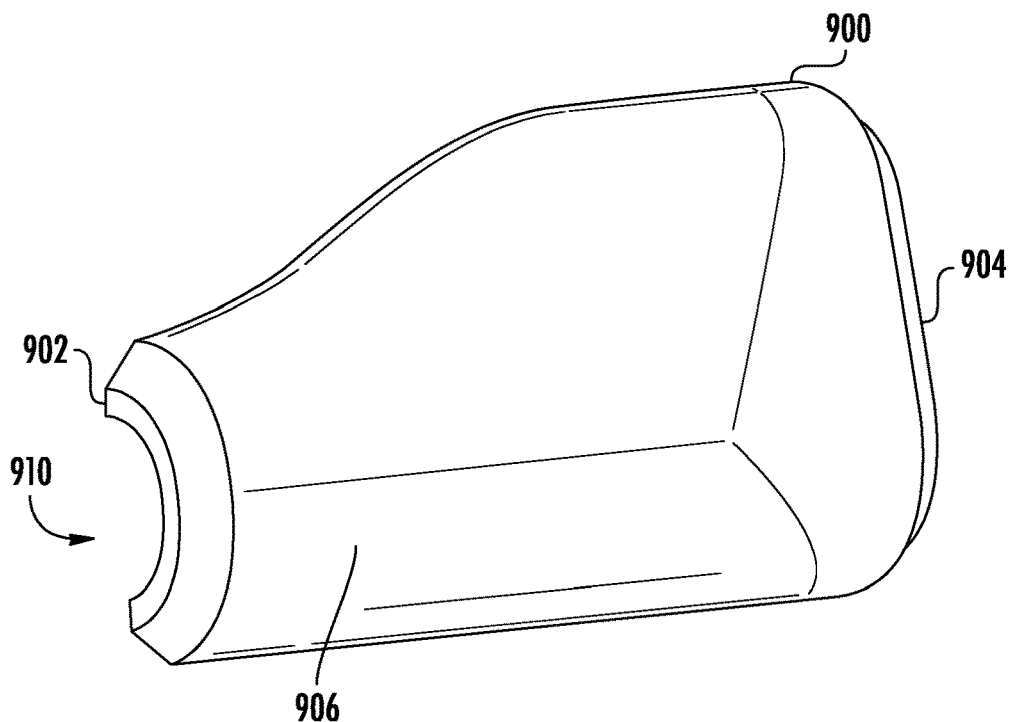
FIG. 9A is a perspective view of an exterior of a first half shell of the junction shell of FIG. 7, in accordance with aspects of the present disclosure.
Figure 9B:
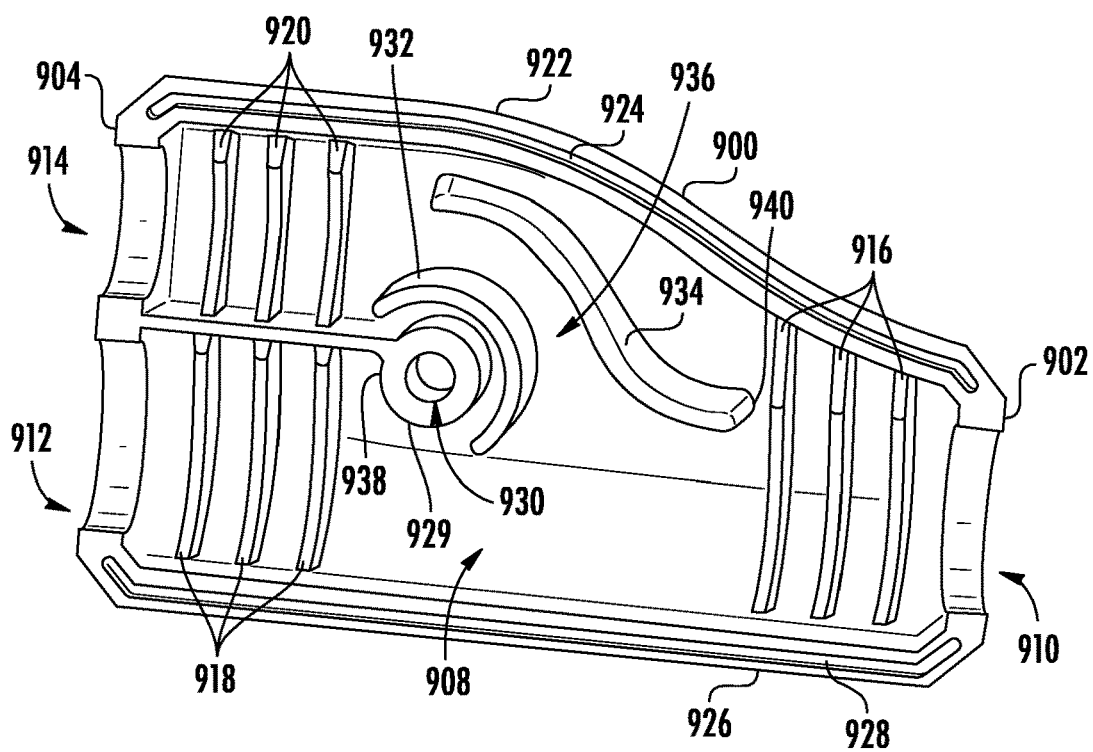
FIG. 9B is a perspective view of an interior of the first half shell of the junction shell of FIG. 9A, in accordance with aspects of the present disclosure.

FIGS. 9A-10C are views of half shells of the junction shell 322 (see FIGS. 3A-3C and 7) and attachment thereto to a distribution cable 100. The junction shell 322 includes a clamshell configuration having two half shells that mate to and are fastened to one another. Referring to FIGS. 9A-9B, the junction shell 322 includes a first half shell 900 having a frontward end 902 and a rearward end 904 opposite thereto. The first half shell 900 defines an exterior 906 and an interior 908. The first half shell 900 includes a frontward distribution opening 910 at the frontward end 902, a rearward distribution opening 912 at the rearward end 904, and a tap opening 914 at the rearward end 904.

The frontward distribution opening 910 and the rearward distribution opening 912 are aligned with one another and configured to receive half of the distribution jacket 106. The tap opening 914 is proximate and parallel to the rearward distribution opening 912 and configured to receive half of the subunit jacket 116 and/or the tap jacket 509. The first half shell 900 further includes one or more frontward distribution ribs 916 proximate the frontward distribution opening 910 at the interior 908 of the first half shell 900, one or more rearward distribution ribs 918 proximate the rearward distribution opening 912, and/or one or more rearward branch ribs 920 proximate the tap opening 914. In certain embodiments, the ribs 916, 918, 920 are shaped to at least partially correspond to, respectively, the frontward distribution opening 910, the rearward distribution opening 912, and the tap opening 914. In certain embodiments, the ribs 916, 918, 920 provide structural rigidity between the junction shell 322 and the distribution jacket 106, subunit jacket 116, and/or tap jacket 509. In certain embodiments, the ribs 916, 918, 920 also partially define a reservoir for containing an adhesive (e.g., glue) to attach the junction shell 322 to the distribution jacket 106, subunit jacket 116, and/or tap jacket 509.

In certain embodiments, an upper perimeter 922 of the first half shell 900 includes an alignment tongue 924 and a lower perimeter 926 includes an alignment groove 928 to align attachment of the first half shell 900 of the junction shell 322 to the second half shell of the junction shell 322.

In certain embodiments, the first half shell 900 includes a post 929 extending from an interior 908 of the first half shell 900. The post 929 includes a screw hole 930, which in certain embodiments, is configured to have an inner diameter less than an outer diameter of threads of a corresponding fastener such that the fastener digs into and engages the screw hole 930. In certain embodiments, the first half shell 900 includes an inner routing feature 932 partially extending around the post 929 and is configured to maintain a minimum bend radius of a subunit cable 104 extending from the frontward distribution opening 910 through the tap opening 914. In certain embodiments, the first half shell 900 includes an outer routing feature 934 extending near the upper perimeter 922 and configured to maintain a minimum bend radius of a subunit cable 104 extending from the frontward distribution opening 910 through the tap opening 914. In this way, the inner and outer routing features 932, 934 define a routing channel 936 therebetween. The inner and outer routing features 932, 934 offset the subunit cable 104 from the upper perimeter 922 and/or the post 929 to prevent any potential pinching (or other type of damage) to the subunit cable 104 as the junction shell 322 is assembled.

In certain embodiments, the post 929 includes a rearward stop 938 defined by a rearward surface/point of the post 929. In certain embodiments, the outer routing feature 934 includes a frontward stop 940 defined by a frontward surface/point of the outer routing feature 934. The stops 938, 940 fix the junction shell 322 along an axis of the distribution jacket 106.

Figure 9C:
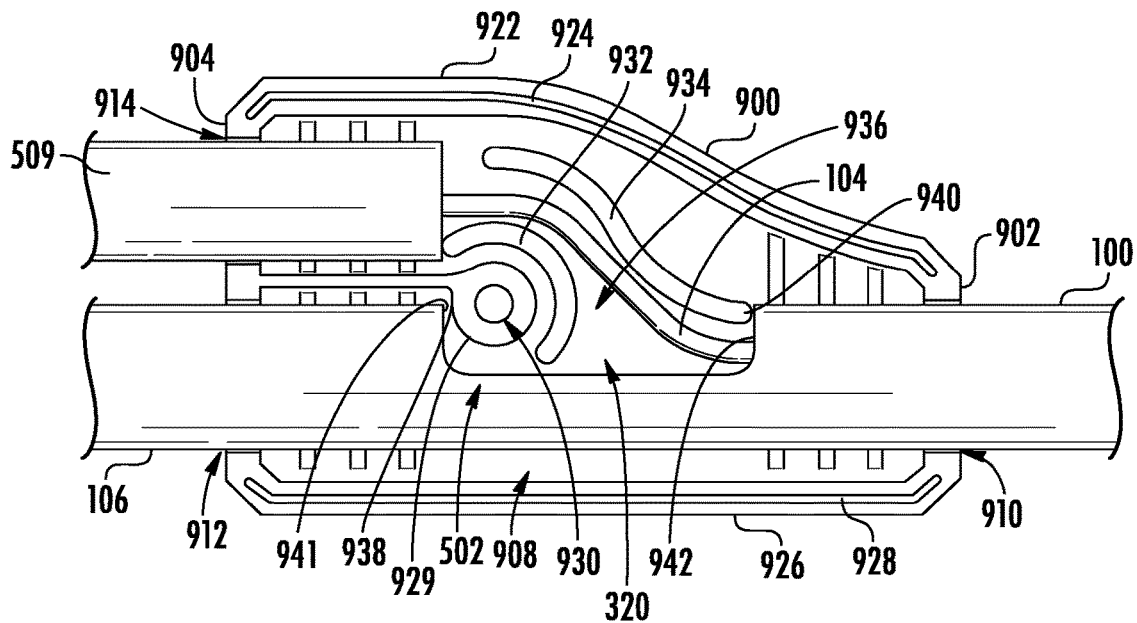
FIG. 9C is a side view of the first half shell of the junction shell of FIG. 9A placed around a junction of the subunit cable and the distribution cable, in accordance with aspects of the present disclosure.
Figure 9D:
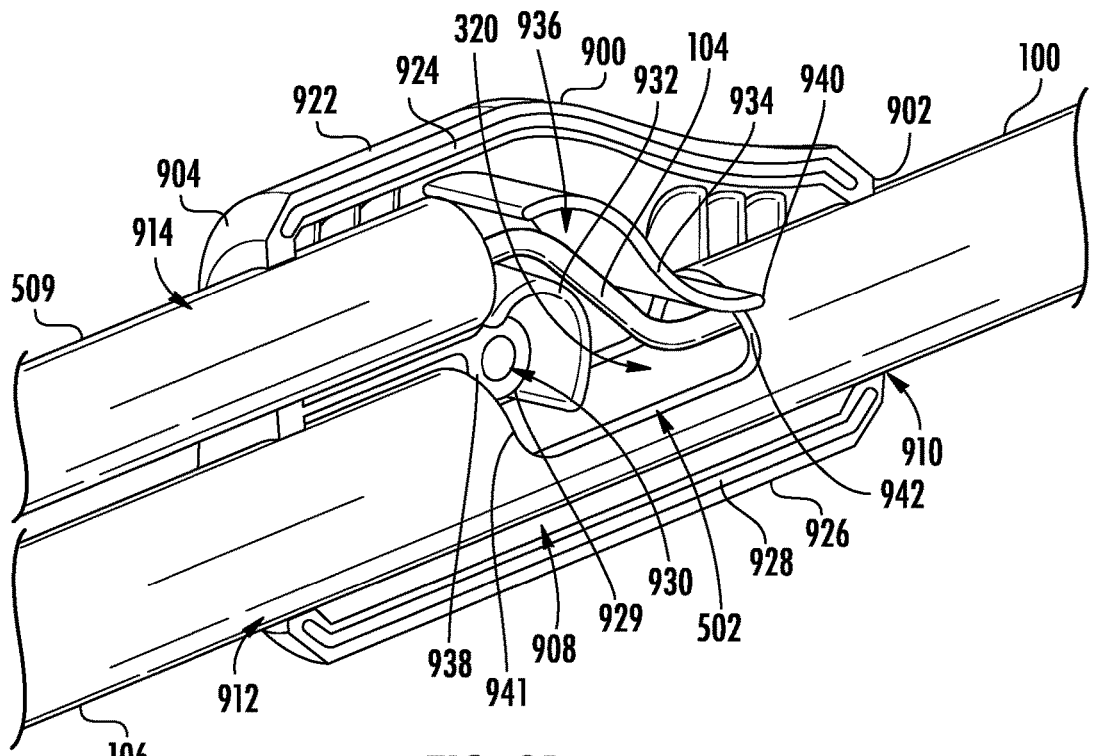
FIG. 9D is a perspective view of the first half shell of the junction shell of FIG. 9C, in accordance with aspects of the present disclosure.

FIGS. 9C-9D illustrate a partial assembly of the first half shell 900 of the junction shell 322 to a tap point 320 of a distribution cable 100. The distribution cable 100 is positioned in the frontward distribution opening 910 and the rearward distribution opening 912 (and contacts the frontward distribution ribs 916 and the rearward distribution ribs 918). The side opening 502 is positioned within the interior 908 of the first half shell 900 but is axially constrained by the frontward stop 940 and the rearward stop 938, which extend past an outer surface of the distribution jacket (e.g., into an interior of the distribution jacket). In other words, the frontward stop 940 is configured to be positioned proximate the frontward end 902 of the side opening 502 and the rearward stop 938 proximate the rearward end 942 of the side opening 502 to fix the junction shell 322 along an axis of the distribution jacket 106. Accordingly, the side opening 502 provides a predefined place where the closure can snap in. Doing so reduces the need for adhesives or mechanical crimps.

The tap jacket 509 extends into the tap opening 914 (and contacts the ribs 920). A subunit cable 104 extends from the tap jacket 509 through the routing channel 936 (defined by the inner routing feature 932 and the outer routing feature 934) and to the frontward distribution opening 910 (and into the distribution jacket 106).

Figure 10A:
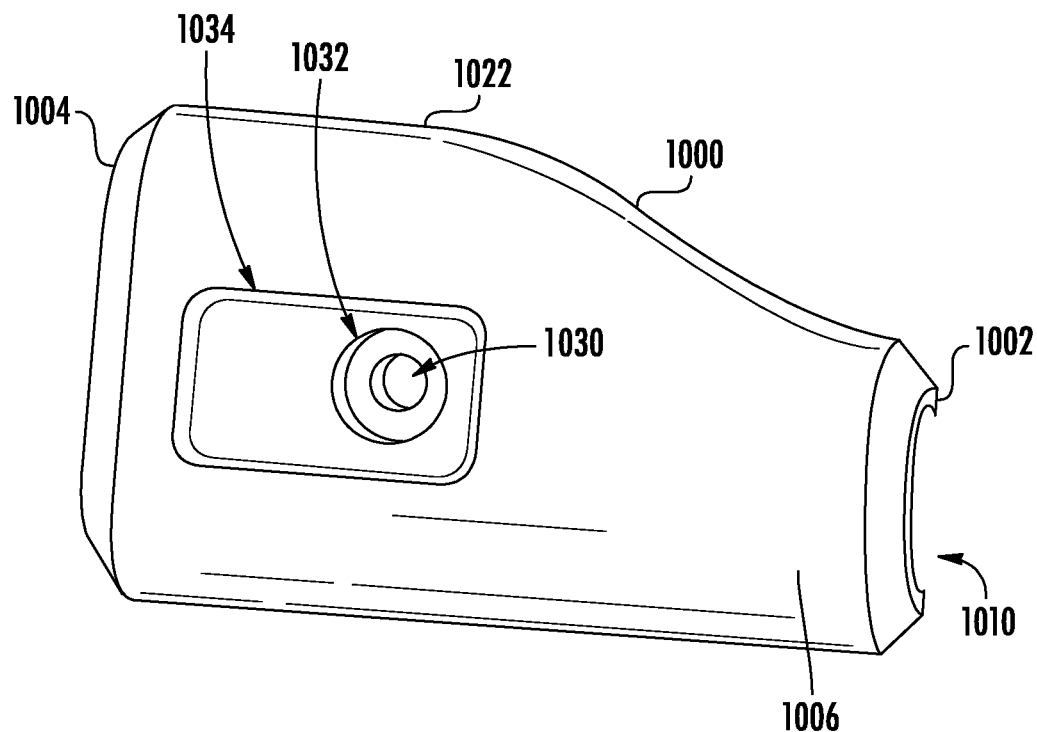
FIG. 10A is a perspective view of an exterior of a second half shell of the junction shell of FIG. 7, in accordance with aspects of the present disclosure.
Figure 10B:
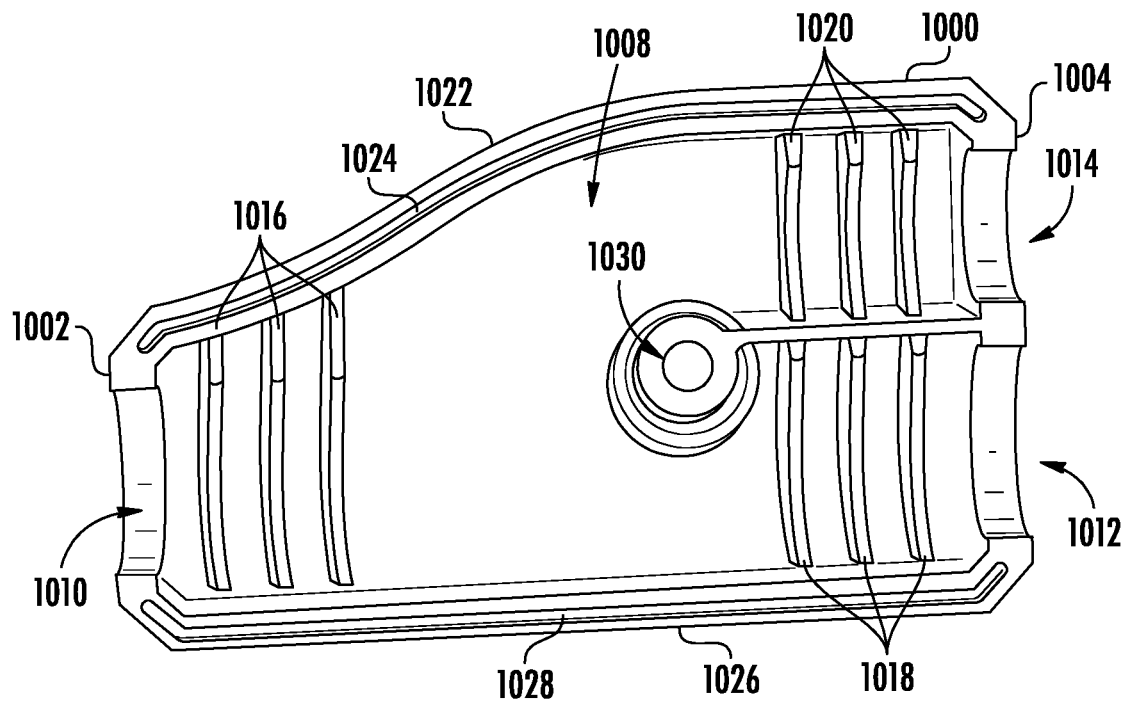
FIG. 10B is a perspective view of an interior of the second half shell of the junction shell of FIG. 10A, in accordance with aspects of the present disclosure.

Referring to FIGS. 10A-10B, the junction shell 322 (see FIGS. 3A-3C and 7) includes a second half shell 1000 having a frontward end 1002 and a rearward end 1004 opposite thereto. The second half shell 1000 defines an exterior 1006 and an interior 1008. The second half shell 1000 includes a frontward distribution opening 1010 at the frontward end 1002, a rearward distribution opening 1012 at the rearward end 1004, and a tap opening 1014 at the rearward end 1004.

The frontward distribution opening 1010 and the rearward distribution opening 1012 are aligned with one another and configured to receive half of the distribution jacket 106. The tap opening 1014 is proximate and parallel to the rearward distribution opening 1012 and configured to receive half of the subunit jacket 116 and/or the tap jacket 509. The second half shell 1000 further includes one or more frontward distribution ribs 1016 proximate the frontward distribution opening 1010 at the interior 1008 of the second half shell 1000, one or more rearward distribution ribs 1018 proximate the rearward distribution opening 1012, and/or one or more rearward tap ribs 1020 proximate the tap opening 1014. In certain embodiments, the ribs 1016, 1018, 1020 are shaped to at least partially correspond to, respectively, the frontward distribution opening 1010, the rearward distribution opening 1012, and the tap opening 1014. In certain embodiments, the ribs 1016, 1018, 1020 provide structural rigidity between the junction shell 322 and the distribution jacket 106, subunit jacket 116, and/or tap jacket 509. In certain embodiments, the ribs 1016, 1018, 1020 also partially define a reservoir for containing an adhesive (e.g., glue) to attach the junction shell 322 to the distribution jacket 106, subunit jacket 116, and/or tap jacket 509.

In certain embodiments, an upper perimeter 1022 of the second half shell 1000 includes an alignment groove 1024 and a lower perimeter 1026 includes an alignment tongue 1028 to align attachment of the second half shell 1000 of the junction shell 322 with the first half shell 900 of the junction shell 322. Accordingly, these alignment features of the first half shell 900 and the second half shell 1000 correspond to engage one another and align the first half shell 900 and the second half shell 1000 with one another.

In certain embodiments, the second half shell 1000 includes a screw through hole 1030 extending from an interior surface of the second half shell 1000. In certain embodiments the screw through hole 1030 is configured to have an inner diameter greater than an outer diameter of threads of a corresponding fastener such that the fastener extends through the screw through hole 1030. Further, in certain embodiments, the second half shell 1000 includes a countersink 1032 aligned with the screw through hole 1030. In certain embodiments, the second half shell 1000 includes a recess 1034 with the screw through hole 1030 positioned in the recess 1034. The recess 1034 could be used to receive a label which would cover the fastener and the screw through hole 1030. The countersink 1032 allows the label to be positioned in the recess and lay flat.

Figure 11:
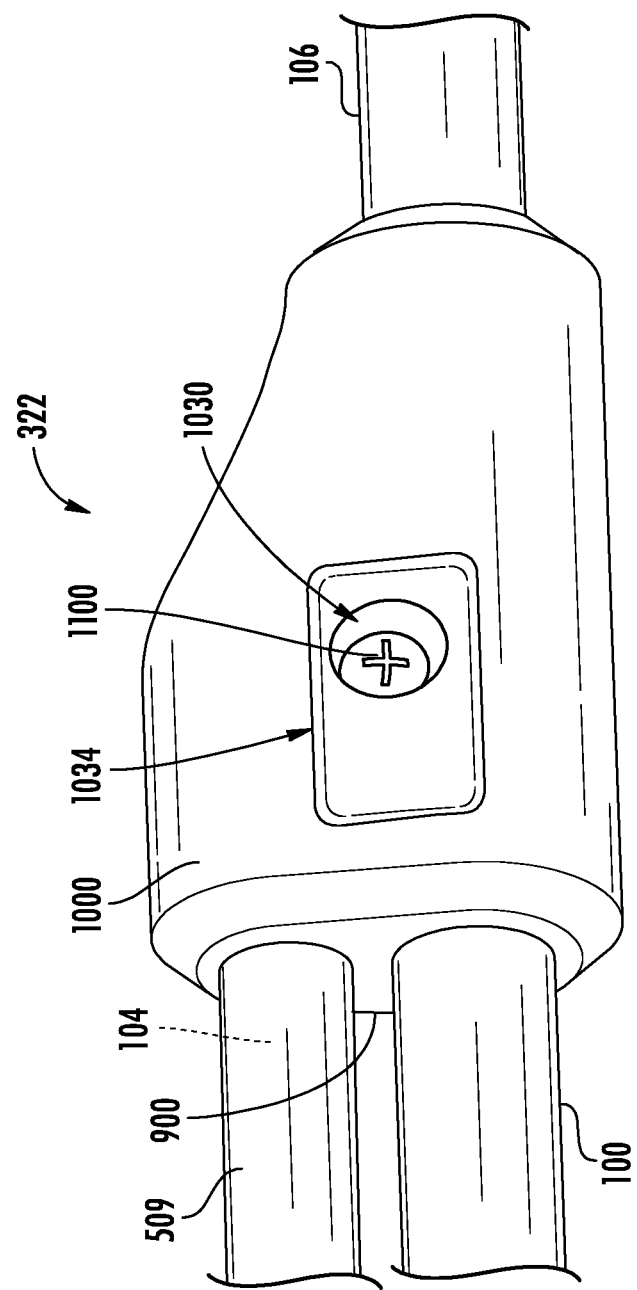
FIG. 11 is a side view of the first half shell of the junction shell of FIG. 10A placed around a junction of the subunit cable and the distribution cable and fastened to the first half shell of the junction shell, in accordance with aspects of the present disclosure.

FIG. 11 is a side view of the first half shell 900 of the junction shell 322 placed around a junction of the subunit cable 104 and the distribution cable 100 and attached to the first half shell 900 of the junction shell 322 by a fastener 1100 (e.g., screw). In particular, the junction shell 322 is attached to the distribution jacket 106 and covering the side opening 502.

Figure 12A:
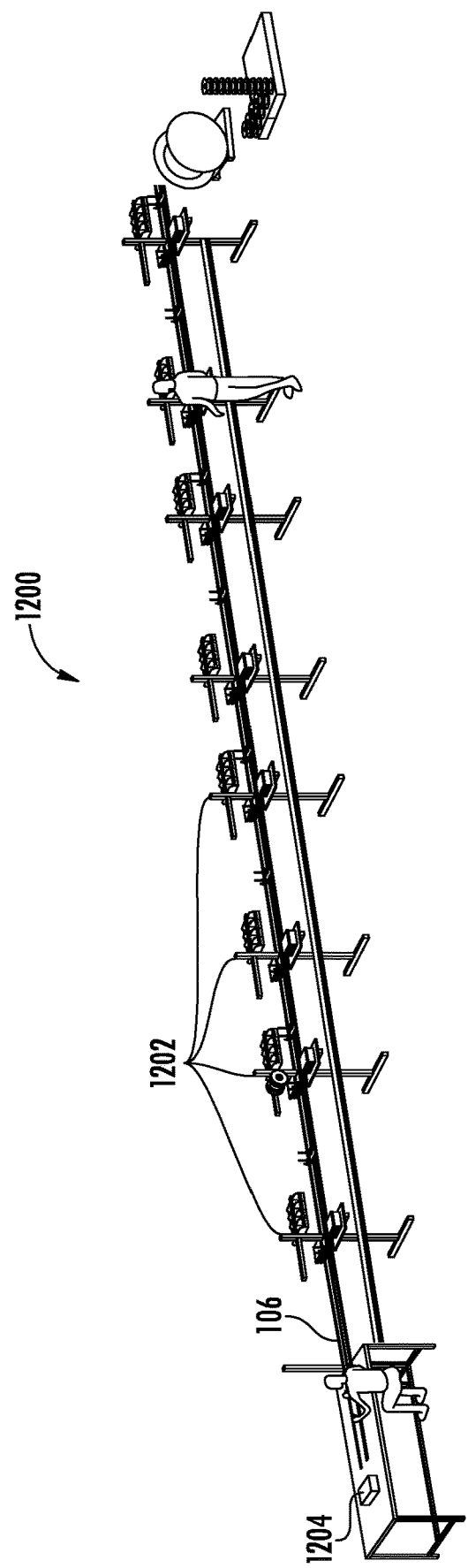
FIG. 12A is a perspective view of an assembly line for manufacturing a preconnectorized distribution cable assembly made by the method of FIGS. 5A-7, in accordance with aspects of the present disclosure.
Figure 12B:
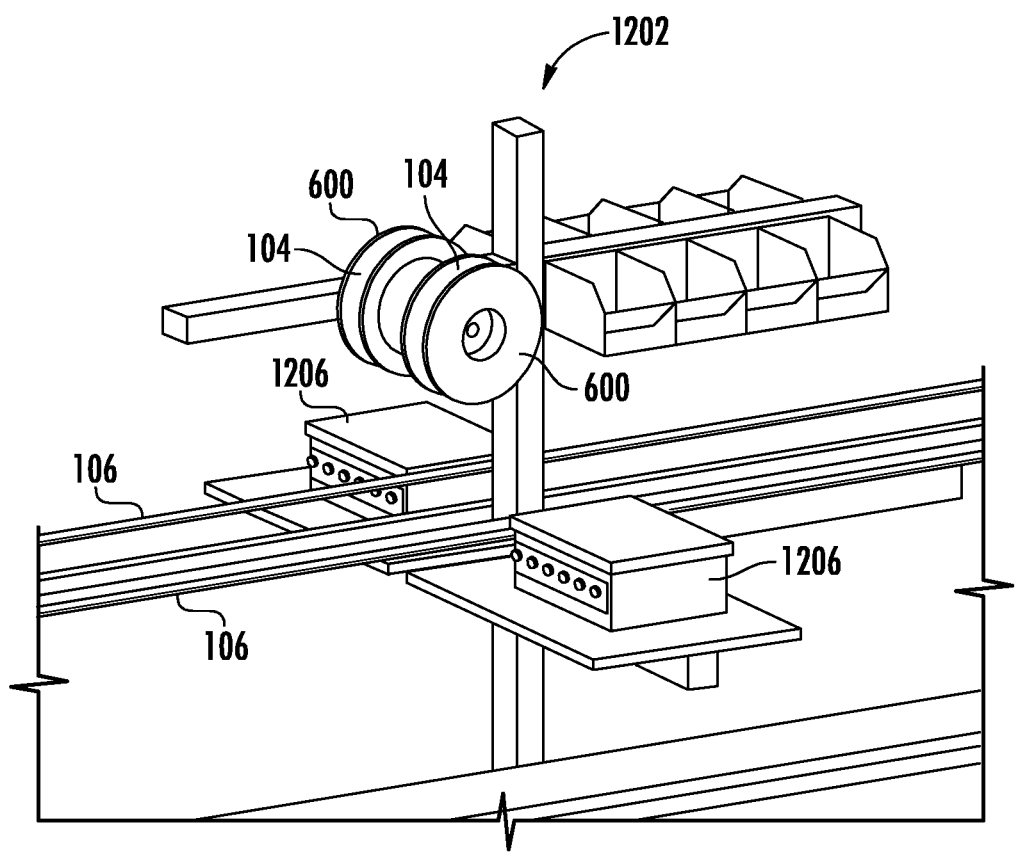
FIG. 12B is a perspective view of a station of the assembly line of FIG. 12A, in accordance with aspects of the present disclosure.

FIGS. 12A-12B are views of a cable assembly system 1200 including a plurality of stations 1202 for assembling a distribution cable assembly 100 as discussed above, and using any method discussed herein. The distribution jacket 106 extends from proximate an output device 1204 to a plurality of stations 1202 depending on the required length of the distribution cable assembly 100 and the number of tap points 320 required. The output device 1204 is configured to receive and/or indicate receipt of an optical signal into the distribution cable assembly 100.

Referring to FIG. 12B, each station may include an input device 1206 (may also be referred to herein as a fiber detection system) to generate an optical signal to the output device 1204 (see FIG. 12A). In this way, an operator can plug distribution connectors 308 (see FIGS. 3A-3C) into the output device 1204, tap connectors 314 (see FIGS. 3A-3C) into the input device 1206, and test the performance of the distribution cable assembly 300 (see FIGS. 3A-3C). In certain embodiments, each station includes multiple input devices 1206, such as if the distribution cable assembly 100 includes multiple tap tethers 326" (see FIGS. 3A-3C) at one tap point 320 (see FIGS. 3A-3C) and/or to work on multiple distribution cable assemblies 100 simultaneously. In certain embodiments, each station can include one or more reels 600 of subunit cables 104 for attaching to a pull string 508 (as discussed above).

Figure 13:
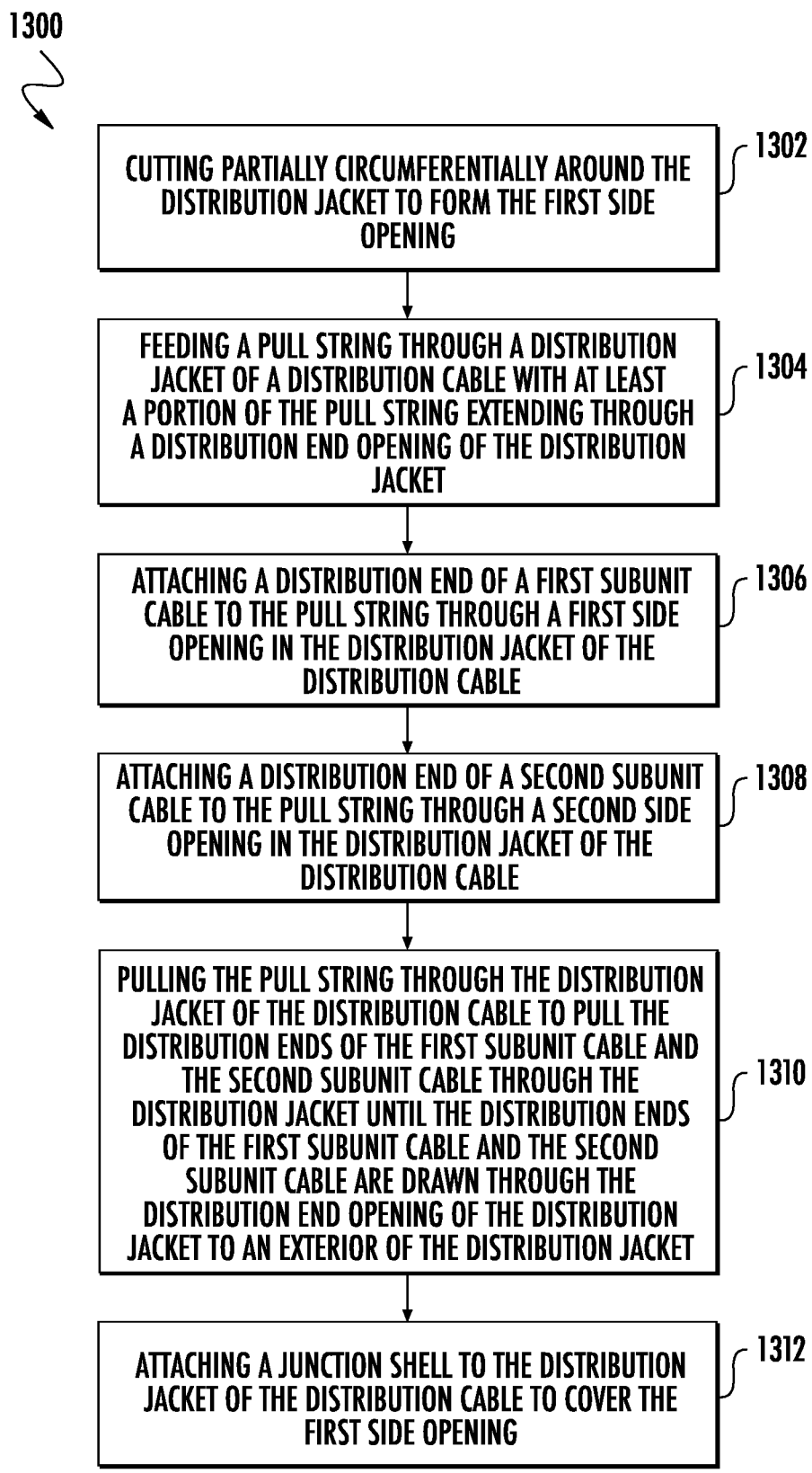
FIG. 13 is a flowchart of steps for making a distribution cable assembly of FIGS. 3A-3C, in accordance with aspects of the present disclosure.

FIG. 13 is a flowchart 1300 of steps for making a distribution cable assembly 100, in accordance with aspects of the present disclosure. Step 1302 includes cutting partially circumferentially around the distribution jacket 106 to form the first side opening 502(1). In certain embodiments, the first side opening 502(1) includes a scallop shape. In certain embodiments, the second side opening 502(2) is positioned a different length than the first side opening 502(1) from the distribution end opening 500 of the distribution jacket 106. Step 1304 includes feeding a pull string 508 through a distribution jacket 106 of a distribution cable 100 with at least a portion of the pull string 508 extending through a distribution end opening 500 of the distribution jacket 106.

Step 1306 includes attaching a distribution end 510 of a first subunit cable 104(1) to the pull string 508 through a first side opening 502(1) in the distribution jacket 106 of the distribution cable 100. The first subunit cable 104(1) includes at least one optical fiber 124. In certain embodiments, the distribution end 510 of the first subunit cable 104(1) is attached to the pull string 508 via a first clip 512(1). Step 1308 includes attaching a distribution end 510 of a second subunit cable 104(2) to the pull string 508 through a second side opening 502(2) in the distribution jacket 106 of the distribution cable 100. The second subunit cable 104(2) includes at least one optical fiber 124. In certain embodiments, the distribution end 510 of the second subunit cable 104(2) is attached to the pull string 508 via a first clip 512(1). In certain embodiments, the method further includes attaching a plurality of subunit cables 104(1)-104(2) to the pull string 508 through a plurality of side openings 502(1)-502(2) in the distribution jacket 106 of the distribution cable 100.

Step 1310 includes pulling the pull string 508 through the distribution jacket 106 of the distribution cable 100 to pull the distribution ends 510 of the first subunit cable 104(1) and the second subunit cable 104(2) through the distribution jacket 106 until the distribution ends 510 of the first subunit cable 104(1) and the second subunit cable 104(2) are drawn through the distribution end opening 500 of the distribution jacket 106 to an exterior of the distribution jacket 106. In certain embodiments, the method includes after pulling the pull string 508, cutting the first subunit cable 104(1) from a reel 600 proximate the first side opening 502(1) to form a tap end 316 of the first subunit cable 104(1).

Step 1312 includes attaching a junction shell 322 to the distribution jacket 106 of the distribution cable 100 to cover the first side opening 502(1). In certain embodiments, the method includes attaching a junction shell 322 to the distribution jacket 106 of the distribution cable 100 by positioning frontward and rearward stops 940, 938 within a first half shell 900 of the junction shell 322 between frontward and rearward ends 941, 942 of the first side opening 502(1) of the distribution jacket 106.

In certain embodiments, the method further includes connectorizing the distribution end 510 of the first subunit cable 104(1) pulled through the distribution jacket 106. In certain embodiments, a tap end 316 of the first subunit cable 104(1) is preconnectorized before pulling the distribution end pull string 508. In certain embodiments, each of the first subunit cable 104(1) and the second subunit cable 104(2) is connectorized with a distribution connector 308 at the distribution end 510 and a tap connector at a tap end 316. In certain embodiments, a tap end 316 of the first subunit cable 104(1) comprises a plurality of tether subunits 114.

In certain embodiments, the plurality of subunit cables 104(1)-104(2) includes at least two subunits (e.g., eight subunits) including the first subunit cable 104(1) and the second subunit cable 104(2), each subunit cable 104(1)-104(2) including at least 2 fibers (e.g., 12 fibers). In certain embodiments, the method further includes furcating the at least 2 fibers of each subunit cable 104(1)-104(2) into at least one 2-fiber tether subunit 114 (e.g., furcating the 12 fibers of each subunit cable 104(1)-104(2) into six 2-fiber tether subunits 114).

Figure 14:
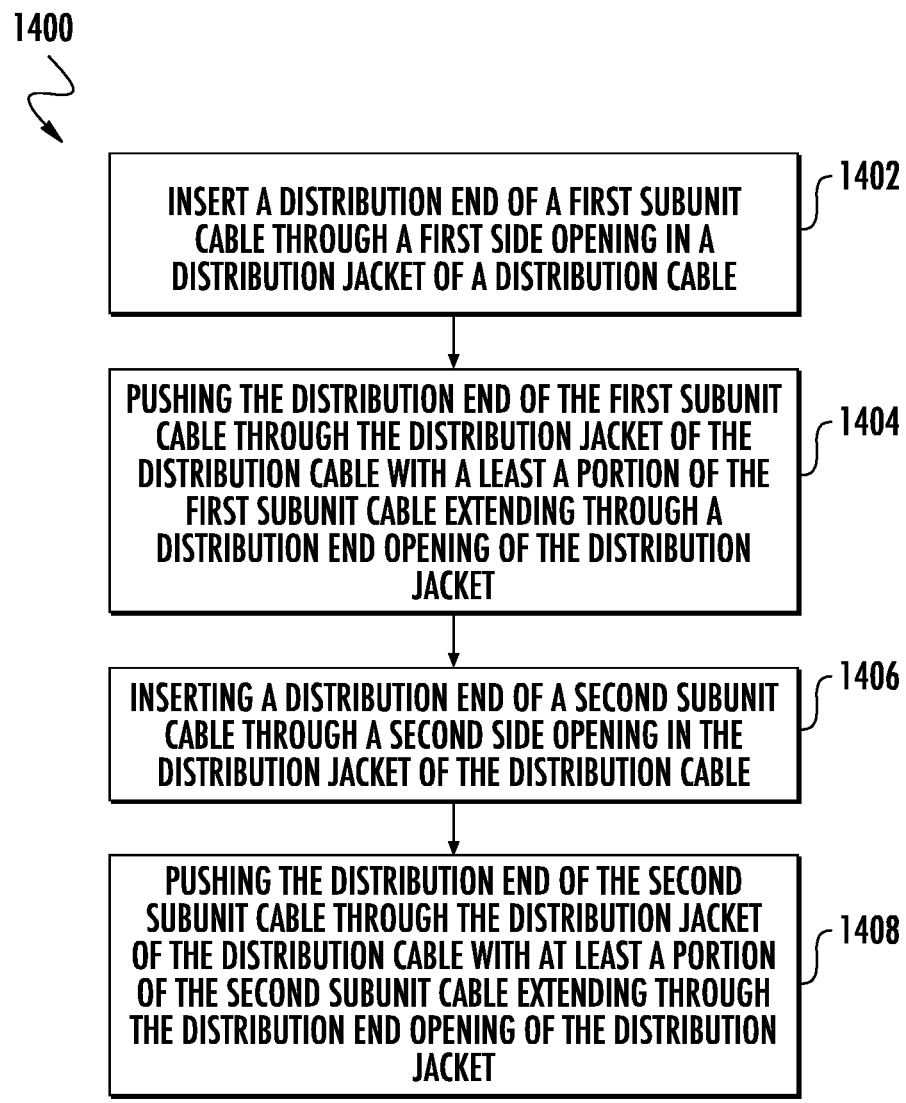
FIG. 14 is a flowchart of steps for making a distribution cable assembly of FIGS. 3A-3C, in accordance with aspects of the present disclosure.

FIG. 14 is a flowchart 1400 of steps for making a distribution cable assembly 100, in accordance with aspects of the present disclosure. Step 1402 includes inserting a distribution end 510 of a first subunit cable 104(1) through a first side opening 502(1) in a distribution jacket 106 of a distribution cable 100. The first subunit cable 104(1) includes at least one optical fiber 124. Step 1404 includes pushing the distribution end 510 of the first subunit cable 104(1) through the distribution jacket 106 of the distribution cable 100 with at least a portion of the first subunit cable 104(1) extending through a distribution end opening 500 of the distribution jacket 106. Step 1406 includes inserting a distribution end 510 of a second subunit cable 104(2) through a second side opening 502(2) in the distribution jacket 106 of the distribution cable 100. The second subunit cable 104(2) includes at least one optical fiber 124. Step 1408 includes pushing the distribution end 510 of the second subunit cable 104(2) through the distribution jacket 106 of the distribution cable 100 with at least a portion of the second subunit cable 104(2) extending through the distribution end opening 500 of the distribution jacket 106. In certain embodiments, a tap end 316 of the first subunit cable 104(1) is preconnectorized before pushing the distribution end 510 of the first subunit cable 104(1).

It will be apparent to those skilled in the art that various modifications and variations can be made without departing from the spirit or scope of the invention.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Many modifications and other embodiments of the concepts in this disclosure will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A distribution cable assembly, comprising:
   a distribution cable comprising a distribution jacket defining a distribution end opening and a first side opening defining a frontward end and a rearward end; and
   a junction shell attached to the jacket and comprising a clamshell covering the first side opening, the junction shell including a frontward distribution opening, a rearward distribution opening, and a tap opening proximate and parallel to the rearward distribution opening, the junction shell including a frontward stop and a rearward stop in an interior thereof, the frontward stop proximate the frontward end of the first side opening and the rearward stop proximate the rearward end of the first side opening, wherein the frontward stop and the rearward stop extend through the first side opening and past an outer surface of the distribution jacket into an interior of the distribution jacket to fix the junction shell along an axis of the jacket.

2. The distribution cable assembly of claim 1, wherein the junction shell includes a first half shell attached to a second half shell by a fastener, the first half shell including the frontward stop and the rearward stop.

3. The distribution cable assembly of claim 2, wherein the first half shell of the junction shell further includes at least one routing feature to route a subunit cable from the frontward distribution opening to the tap opening.

4. The distribution cable assembly of claim 3, wherein the at least one routing feature comprises the frontward stop.

5. The distribution cable assembly of claim 2, wherein the first half shell of the junction shell is attached to the second half shell of the junction shell by a screw, the first half shell of the junction shell comprising a screw hole.

6. The distribution cable assembly of claim 5, wherein the screw hole comprises the rearward stop.

7. The distribution cable assembly of claim 2, wherein the first half shell of the junction shell further comprises at least one rib proximate each of the frontward distribution opening, the rearward distribution opening, and the tap opening.

8. The distribution cable assembly of claim 2, wherein the distribution cable comprises a plurality of side openings, each of the plurality of side openings covered by one of a plurality of junction shells.

\* \* \* \* \*